(12) United States Patent
Kimoto et al.

(10) Patent No.: US 9,088,758 B2
(45) Date of Patent: Jul. 21, 2015

(54) MARK INFORMATION RECORDING APPARATUS, MARK INFORMATION PRESENTING APPARATUS, MARK INFORMATION RECORDING METHOD, AND MARK INFORMATION PRESENTING METHOD

(75) Inventors: Masashi Kimoto, Tokyo (JP); Masato Kajimoto, Chiba (JP); Seiji Miyama, Kanagawa (JP); Hirofumi Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 189 days.

(21) Appl. No.: 13/550,237

(22) Filed: Jul. 16, 2012

(65) Prior Publication Data

US 2013/0182147 A1    Jul. 18, 2013

(30) Foreign Application Priority Data

Jul. 21, 2011    (JP) .................................. 2011-159541

(51) Int. Cl.
*G06K 9/54*    (2006.01)
*G06K 9/60*    (2006.01)
*H04N 5/76*    (2006.01)
*H04N 1/32*    (2006.01)

(52) U.S. Cl.
CPC ............ *H04N 5/76* (2013.01); *H04N 1/32101* (2013.01); *H04N 2201/325* (2013.01); *H04N 2201/3245* (2013.01); *H04N 2201/3252* (2013.01); *H04N 2201/3264* (2013.01)

(58) Field of Classification Search
USPC ......................................................... 382/305
See application file for complete search history.

(56) References Cited

U.S. PATENT DOCUMENTS

| | | | |
|---|---|---|---|
| 6,584,221 B1 | 6/2003 | Moghaddam et al. |
| 2005/0174457 A1 | 8/2005 | Yoshino et al. |
| 2007/0116456 A1 | 5/2007 | Kuriakose et al. |
| 2007/0274585 A1 | 11/2007 | Zhang et al. |
| 2008/0044068 A1 | 2/2008 | Evertsz et al. |
| 2008/0136838 A1 | 6/2008 | Goede et al. |
| 2008/0174676 A1 | 7/2008 | Squilla et al. |
| 2010/0085383 A1 | 4/2010 | Cohen et al. |

(Continued)

FOREIGN PATENT DOCUMENTS

| | | |
|---|---|---|
| EP | 1594311 | 11/2005 |
| EP | 1912432 | 4/2008 |

(Continued)

OTHER PUBLICATIONS

Extended European Search Report issued in connection with European Patent Application Serial No. 12005168.5, dated Nov. 12, 2012. (6 pages).

(Continued)

*Primary Examiner* — John Strege
(74) *Attorney, Agent, or Firm* — K&L Gates LLP

(57) ABSTRACT

A mark information recording apparatus includes an output unit and a recording unit. The output unit is configured to output, for displaying a partial image being a part of an entire image having an arbitrary resolution among entire images generated at a plurality of different resolutions with respect to a single target, the partial image. The recording unit is configured to associate mark information with information on a position within the entire image and information on the resolution of the output partial image and record the mark information.

5 Claims, 22 Drawing Sheets

(56) References Cited

U.S. PATENT DOCUMENTS

| | | | |
|---|---|---|---|
| 2011/0039598 A1* | 2/2011 | Tang et al. | 455/556.1 |
| 2011/0128295 A1* | 6/2011 | Kimoto et al. | 345/589 |
| 2011/0129135 A1* | 6/2011 | Mizutani et al. | 382/128 |
| 2011/0164679 A1* | 7/2011 | Satou et al. | 375/240.03 |

FOREIGN PATENT DOCUMENTS

| | | |
|---|---|---|
| EP | 1976271 | 10/2008 |
| JP | 04-307038 | 10/1992 |
| JP | 2005-236906 | 9/2005 |
| JP | 2005-293339 | 10/2005 |
| JP | 2010-015504 | 1/2010 |
| JP | 2011-078527 | 4/2011 |
| JP | 2011-133849 | 7/2011 |
| WO | 2005/098758 | 10/2005 |
| WO | 2010/120061 | 10/2010 |
| WO | 2011/019467 | 2/2011 |

OTHER PUBLICATIONS

Reasons for refusal notice issued in connection with Japanese Patent Application No. 2011-159541, dated Dec. 2, 2014. (4 pages).

* cited by examiner

| ID | X coordinate | Y coordinate | Observation magnification | Audio information | Mark information |
|---|---|---|---|---|---|
| 1 | 2000 | 3000 | * 20 | Cell nucleus is abnormal | Blue circle |
| 2 | 5000 | 1000 | * 10 | Cell shape is slightly abnormal | Blue circle |
| 3 | .... | .... | .... | .... | .... |

| ID | Audio information | Coordinate 1 | Coordinate 2 | Coordinate 3 | ... | Coordinate n | Mark information |
|---|---|---|---|---|---|---|---|
| 1 | Cell nucleus is abnormal | X:2000, Y:2000, Magnification: ×20 | X:2005, Y:2000, Magnification: ×20 | X:2010, Y:22010, Magnification: ×21 | ... | X:3300, Y:24100, Magnification: ×30 | Blue circle |
| 2 | ... | ... | ... | ... | ... | ... | ... |

FIG.13

| ID | X coordinate | Y coordinate | Observation magnification | Audio information | Mark information | Priority |
|---|---|---|---|---|---|---|
| 1 | 2000 | 3000 | * 20 | Cell nucleus is abnormal | Blue circle | 1 |
| 2 | 5000 | 1000 | * 10 | Cell shape is slightly abnormal | Green circle | 2 |
| 2 | .... | .... | .... | .... | .... | .... |

| ID | X coordinate | Y coordinate | Observation magnification | Set magnification | Audio information | Mark information |
|---|---|---|---|---|---|---|
| 1 | 2000 | 3000 | * 30 | * 25 | Cell nucleus is abnormal | Blue circle |
| 2 | 5000 | 1000 | * 20 | * 10 | Cell shape is slightly abnormal | Blue circle |
| 3 | .... | .... | .... | .... | .... | .... |

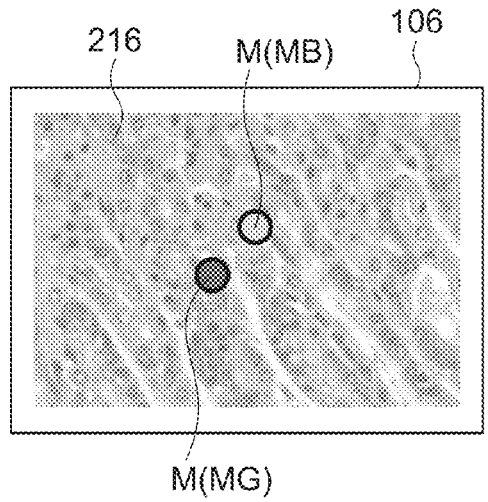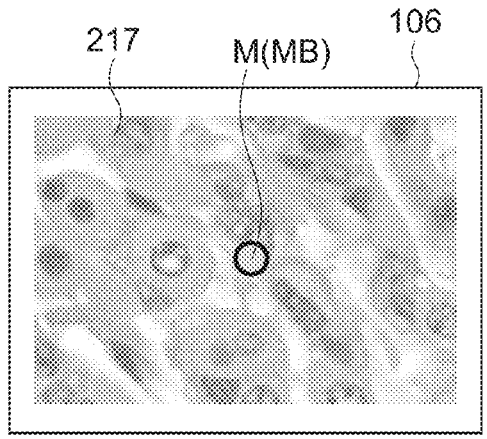
FIG.23A  FIG.23B
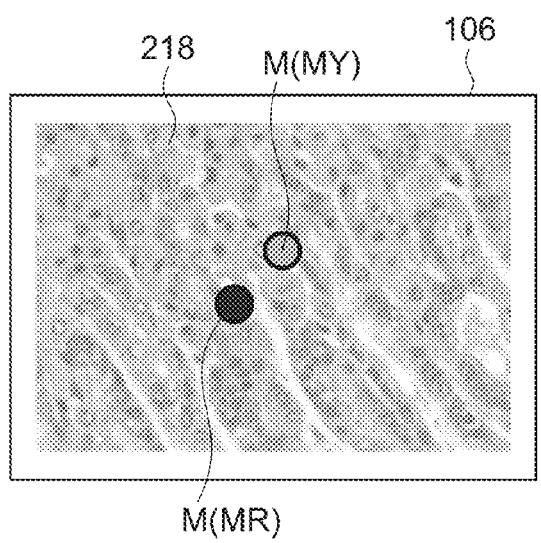
FIG.24

| ID | X coordinate | Y coordinate | Magnification | Audio information | Mark information | Operation information |
|---|---|---|---|---|---|---|
| 1 | 2000 | 3000 | *20 | Cell nucleus is abnormal | Blue circle | Zoom-in |
| 2 | 5000 | 1000 | *10 | No changes are seen | Blue circle | Pan |
| 3 | ... | ... | ... | ... | ... | |

FIG.25

MARK INFORMATION RECORDING APPARATUS, MARK INFORMATION PRESENTING APPARATUS, MARK INFORMATION RECORDING METHOD, AND MARK INFORMATION PRESENTING METHOD

CROSS REFERENCES TO RELATED APPLICATIONS

The present application claims priority to Japanese Priority Patent Application JP 2011-159541 filed in the Japan Patent Office on Jul. 21, 2011, the entire content of which is hereby incorporated by reference.

BACKGROUND

The present application relates to a mark information recording apparatus that records electronic mark information, to a mark information presenting apparatus that presents recorded mark information, and to a mark information recording method and a mark information presenting method.

Japanese Patent Application Laid-open No. 2005-236906 (hereinafter, referred to as Patent Document 1) describes a shooting apparatus that associates, when shooting a moving image, an electronic mark (essence mark) expressing an index relating to a video with a video frame. With this, when editing the video, the user is able to view the frame associated with the electronic mark as a thumbnail and find out a desired video scene (e.g., see paragraphs [0026] and [0030] in the specification of Patent Document 1).

SUMMARY

It is desirable to add electronic mark information to not only a video but also an image.

In view of the above-mentioned circumstances, there is a need for a mark information recording apparatus that records electronic mark information to an image, a mark information presenting apparatus capable of presenting recorded mark information, and a mark information recording method and a mark information presenting method.

According to an embodiment of the present application, there is provided a mark information recording apparatus including an output unit and a recording unit.

The output unit is configured to output, for displaying a partial image being a part of an entire image having an arbitrary resolution among entire images generated at a plurality of different resolutions with respect to a single target, the partial image.

The recording unit is configured to associate mark information with information on a position within the entire image and information on the resolution of the output partial image and record the mark information.

The mark information is recorded while being associated with the position information of the partial image output by the output unit and the information on the resolution of the partial image (resolution of the entire image including the partial image). Therefore, the mark information recording apparatus is capable of adding the mark information depending on the position of the partial image. Further, the mark information recording apparatus is also capable of adding the mark information depending on the resolution in addition to the position of the partial image.

The concept of "associating A with B" includes both the meanings of "associating A with ID identifying B" and "associating ID identifying A with B or ID identifying B."

The recording unit may be configured to record, as the mark information, annotation information and a mark image to be combined in the partial image.

The mark information recording apparatus may further include an annotation information generation unit configured to start, when information on an input operation by a user for starting generation of the annotation information is acquired, the generation of the annotation information. With this configuration, according to the information on the operation by the user, it is possible to record the annotation information when the user desires.

Alternatively, the mark information recording apparatus may further include an annotation information generation unit configured to start, when information on an audio of a speech of a user is acquired, generation of the annotation information. With this configuration, using the start of the speech of the user as a trigger, it is possible to start recording of the mark information.

The mark information recording apparatus may further include an acquisition unit configured to acquire information on an operation by a user for causing the output unit to output the partial image. In this case, the recording unit is configured to associate the mark information with the position information and the resolution information on the partial image output by the output unit according to the operation information acquired by the acquisition unit. With this configuration, it becomes possible to record the mark information associated with the partial image output according to the operation by the user (e.g., the partial image of the entire image, which the user desires to observe).

The recording unit may be configured to associate position information and resolution information with each of partial images different in at least one of the position information and the resolution information, the partial images being output by the output unit according to information on a series of continuous or intermittent operations by the user that is acquired by the acquisition unit. In this case, the recording unit is configured to record information obtained by the association as output history information on each of the partial images and associate the mark information with the history information. With this configuration, it is possible to record the mark information for each piece of history information on the series of operations by the user for continuously outputting the plurality of different partial images.

The recording unit may be configured to execute, when, out of the operation information acquired by the acquisition unit, predetermined operation information is acquired, the association processing of the mark information with respect to the partial image output according to the predetermined operation information. With this configuration, when, out of various types of operation information by a user for outputting the partial image, the limited and predetermined operation information is acquired by the acquisition unit, it is possible to associate the mark information with the partial image output by the operation information.

The recording unit may be configured to associate priority information indicating a priority upon presentation of each of a plurality of pieces of mark information with each of the plurality of pieces of mark information and record the priority information. With this configuration, according to the set priority, it is possible to present at least one of the plurality of pieces of mark information.

The recording unit may be configured to associate, with each of at least two or more resolution ranges including the resolution of the partial image output by the output unit, the mark information. In other words, the recording unit is capable of executing, for each resolution range including the resolution of the output partial image, the association processing of the mark information.

The recording unit may be configured to set a threshold of the resolution according to an operation by the user and to associate the set threshold of the resolution with the position information and the mark information and record the set threshold. With this configuration, upon presentation of the mark information, for example, when the magnification of the partial image to be output becomes equal to or larger than the threshold, it is possible to present the mark information.

According to an embodiment of the present application, there is provided a mark information presenting apparatus including an output unit, a recording unit, and a processing unit.

The output unit is configured to output, for displaying a partial image being a part of an entire image having an arbitrary resolution among entire images generated at a plurality of different resolutions with respect to a single target, the partial image.

The recording unit is configured to associate mark information with information on a position within the entire image and information on the resolution of the output partial image and record the position information and the resolution information that are associated with the mark information as recorded position information and recorded resolution information, respectively.

The processing unit is configured to execute, when an output position information group constituting the partial image to be output includes the recorded position information, processing for presenting the mark information associated with at least the recorded position information.

According to the embodiment of the present application, when the output position information group constituting the partial image to be output in the entire image includes the recorded position information, it is possible to present the mark information associated with the recorded position information.

The processing unit may be configured to execute, when the output position information group includes the recorded position information and a resolution of output resolution information of the partial image to be output by the output unit is equal to a resolution of the recorded resolution information corresponding to the recorded position information, processing for presenting the mark information associated with the recorded position information and the recorded resolution information. With this configuration, it is possible to present the mark information associated with both of the recorded position information and the recorded resolution information on the partial image.

The recording unit may be configured to record, as the mark information, annotation information and a mark image to be combined in the partial image. In this case, the processing unit is configured to execute processing for presenting the annotation information.

The processing unit may be configured to combine, when the output position information group constituting the partial image to be output includes a plurality of pieces of recorded position information, a plurality of mark images associated with the plurality of pieces of recorded position information, in the partial image to be output. With this configuration, when the plurality of pieces of mark information are associated with the single output partial image, it is possible for a display unit connected to this mark information presenting apparatus to display the plurality of mark images associated with the pieces of mark information.

The processing unit may be configured to combine, among a plurality of pieces of recorded resolution information associated with the plurality of pieces of recorded position information, one of an image having a resolution equal to the resolution of the output resolution information of the partial image to be output by the output unit and an image corresponding to resolution information including a resolution within a recorded resolution range, in the partial image to be output.

The recording unit may be configured to associate priority information indicating a priority upon presentation of each of a plurality of pieces of annotation information corresponding to the plurality of images with a plurality of pieces of mark information and record the priority information. In this case, the processing unit is configured to set, according to the recorded priority information, one of whether or not to present the plurality of pieces of annotation information and a time order of presenting the plurality of pieces of annotation information. With this configuration, it is possible to present the pieces of annotation information to the user in a descending priority order.

The recording unit may be configured to associate, with each of at least two or more resolution ranges including the resolution of the output resolution information of the partial image output by the output unit, the annotation information and set a different recorded resolution range for each of different pieces of priority information. In this case, the processing unit is configured to execute processing for presenting at least one piece of annotation information among a plurality of pieces of annotation information according to the set recorded resolution range, the plurality of pieces of annotation information being associated with the plurality of pieces of recorded position information included in the output position information group.

The mark information presenting apparatus may further include an acquisition unit configured to acquire information on an operation by a user for causing the output unit to output the partial image. In this case, the recording unit is configured to execute, when, out of the operation information acquired by the acquisition unit, predetermined operation information is acquired, the association processing of the mark information with respect to the partial image output according to the predetermined operation information. Further, the processing unit is configured to execute, when an output position information group constituting the partial image output according to the predetermined operation information includes the recorded position information, processing for presenting the mark information associated with at least the recorded position information.

According to an embodiment of the present application, there is provided a mark information recording method including outputting, for displaying a partial image being a part of an entire image having an arbitrary resolution among entire images generated at a plurality of different resolutions with respect to a single target, the partial image.

Mark information is recorded while being associated with information on a position within the entire image and information on the resolution of the output partial image.

According to an embodiment of the present application, there is provided a mark information presenting method including outputting, for displaying a partial image being a part of an entire image having an arbitrary resolution among entire images generated at a plurality of different resolutions with respect to a single target, the partial image.

Mark information is associated with information on a position within the entire image and information on the resolution of the output partial image and the position information and the resolution information that are associated with the mark information are recorded as recorded position information and recorded resolution information, respectively.

When an output position information group constituting the partial image to be output includes the recorded position information, processing for presenting the mark information associated with at least the recorded position information is executed.

As described above, according to the embodiments of the present application, it is possible to record mark information to an image. Further, it is possible to present recorded mark information.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 13 is a table of history information that is created by the record processing according to the fifth embodiment;

FIGS. 23A and 23B are diagrams each showing a partial image in which a mark image is combined, which is obtained by presentation processing according to a fifth embodiment;

FIG. 24 is a diagram showing a partial image in which a mark image is combined, which is obtained by the presentation processing according to the fifth embodiment;

FIG. 25 is a table created by the record processing according to the above-mentioned third embodiment, which is used in presentation processing according to a sixth embodiment;

DETAILED DESCRIPTION

Hereinafter, embodiments of the present application will be described with reference to the drawings.

Figure 1:
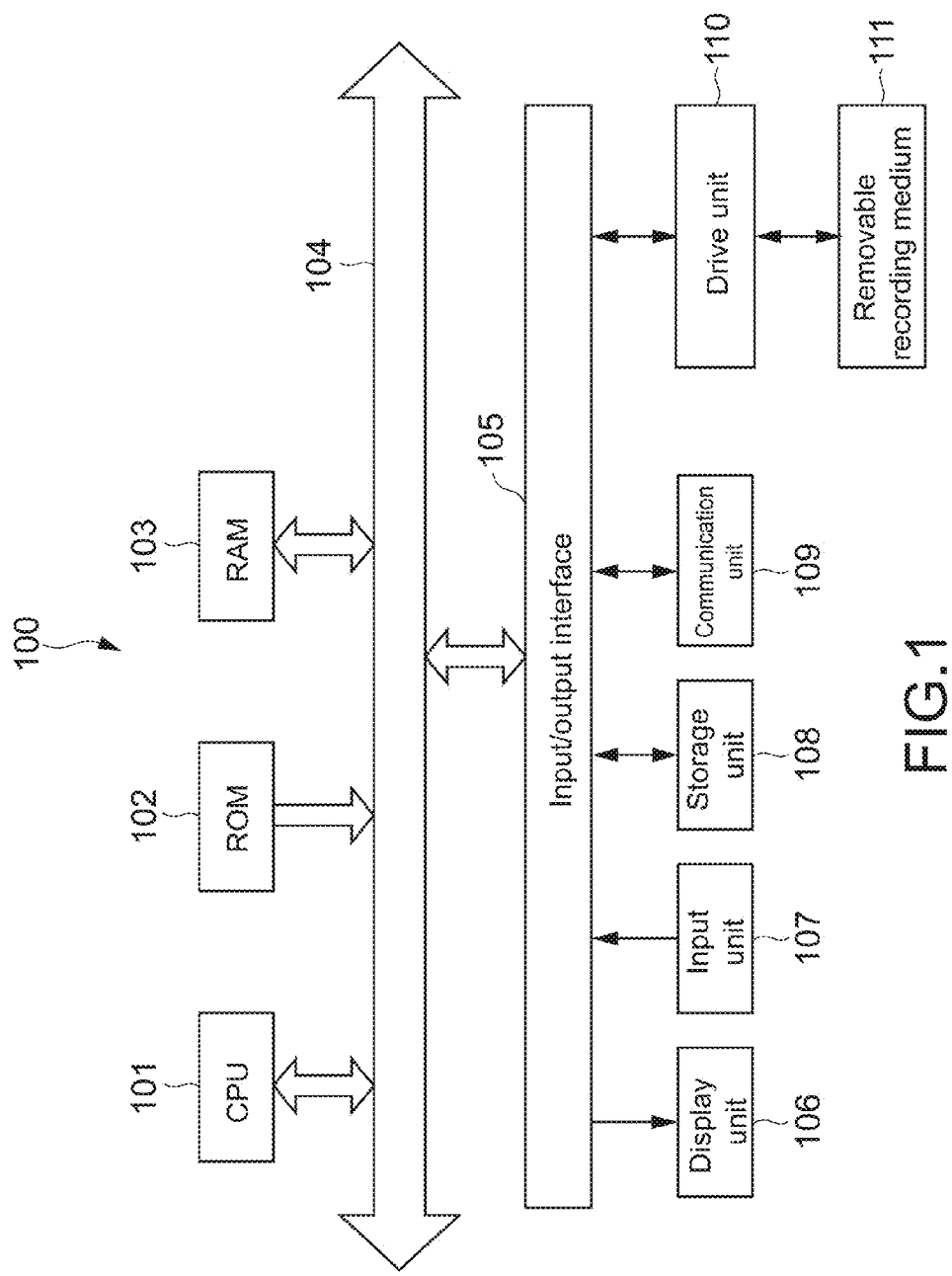
FIG. 1 is a block diagram showing a configuration of hardware of a PC, for example, as an information processing apparatus including a mark information recording apparatus and a mark information presenting apparatus according to an embodiment of the present application.

FIG. 1 is a block diagram showing a configuration of hardware of a PC (personal computer), for example, as an information processing apparatus including a mark information recording apparatus and a mark information presenting apparatus according to an embodiment of the present application.

A PC 100 includes a CPU (central processing unit) 101, a ROM (read only memory) 102, a RAM (random access memory) 103, an input/output interface 105, and a bus 104 that connects them to one another.

To the input/output interface 105, a display unit 106, an input unit 107, a storage unit 108, a communication unit 109, a drive unit 110, and the like are connected.

The display unit 106 is a display device using, for example, a liquid crystal or an EL (electro-luminescence).

The input unit 107 includes, for example, a pointing device, a keyboard, a touch panel, a microphone, and other operation apparatuses. In the case where the input unit 107 includes a touch panel, this touch panel may be integrated with the display unit 106.

Figure 4:
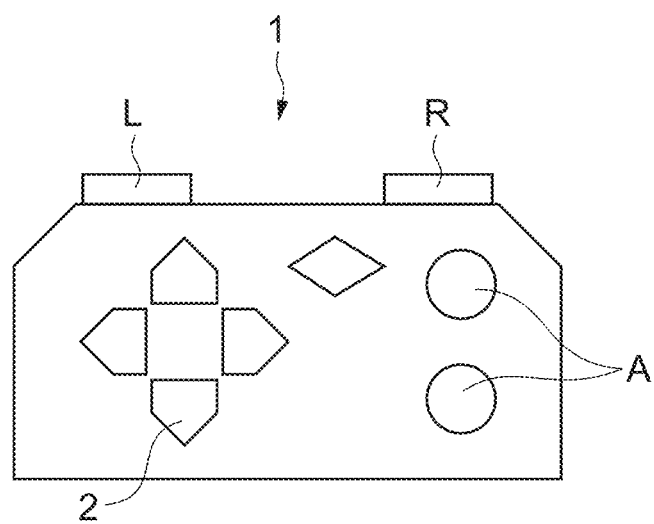
FIG. 4 is a diagram showing an example of an input unit of the PC.

FIG. 4 is a diagram showing an example of the input unit 107. This input unit 107 has shape and functions similar to those of a game controller 1 and includes arrow keys 2 and push buttons A, L, and R, and the like. The arrow keys 2 are, for example, keys for the user to select a specified area (display area) within an entire image in order to specify and display a partial image being a part of the entire image, which will be described later. The push buttons L and R have enlarging and downsizing functions for changing an observation magnification of the partial image. Further, the push buttons A have functions of starting and stopping creation processing of annotation information, which will be described later, or other functions.

The storage unit 108 is a non-volatile storage device and includes, for example, an HDD (hard disk drive), a flash memory, and other solid-state memories.

The drive unit 110 is a device capable of driving a removable recording medium 111 such as an optical recording medium, a floppy (registered trademark) disk, a magnetic recording tape, and a flash memory. In contrast, the above-mentioned storage unit 108 is often used as a device installed into the PC 100 in advance for mainly driving a non-removable recording medium.

The communication unit 109 includes a modem, a router, and other communication devices that are connectable to a LAN (local area network), a WAN (wide area network), and the like and communicate with other devices. The communication unit 109 may perform a wired or wireless communication. The communication unit 109 is often used separately from the PC 100.

Figure 2:
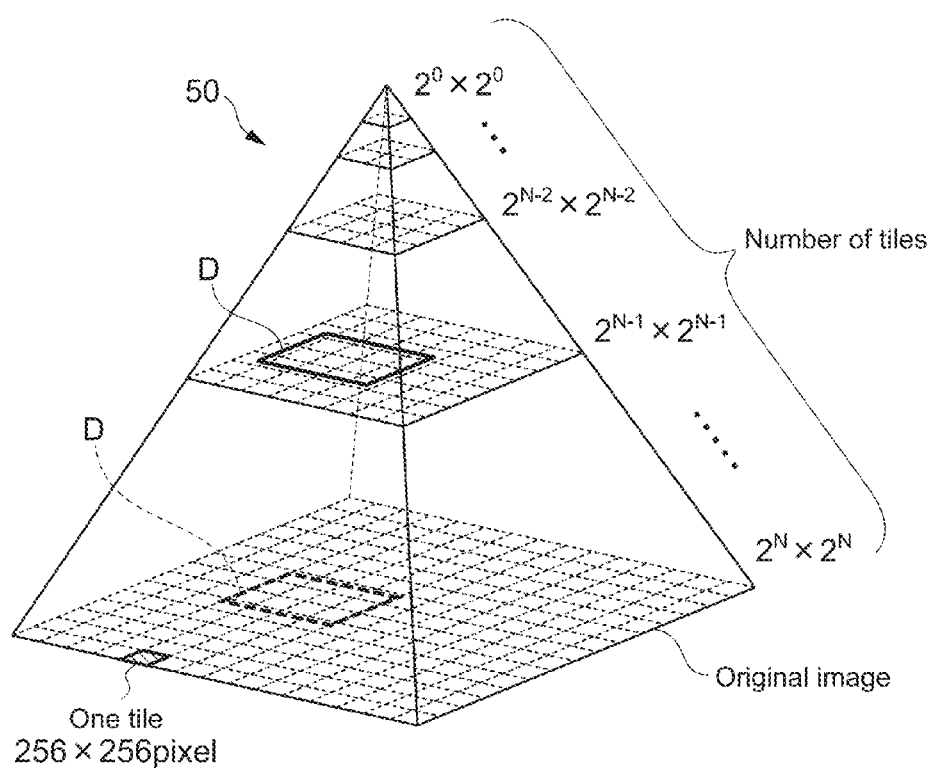
FIG. 2 is a diagram showing an image pyramid structure for describing a principle of displaying images of the image pyramid structure.

Next, an image obtained by an optical microscope (not shown) to be mainly stored in the storage unit 108 of the PC 100 and a principle of displaying the image will be described. FIG. 2 is a diagram showing an image pyramid structure for describing the displaying principle.

Figure 3:
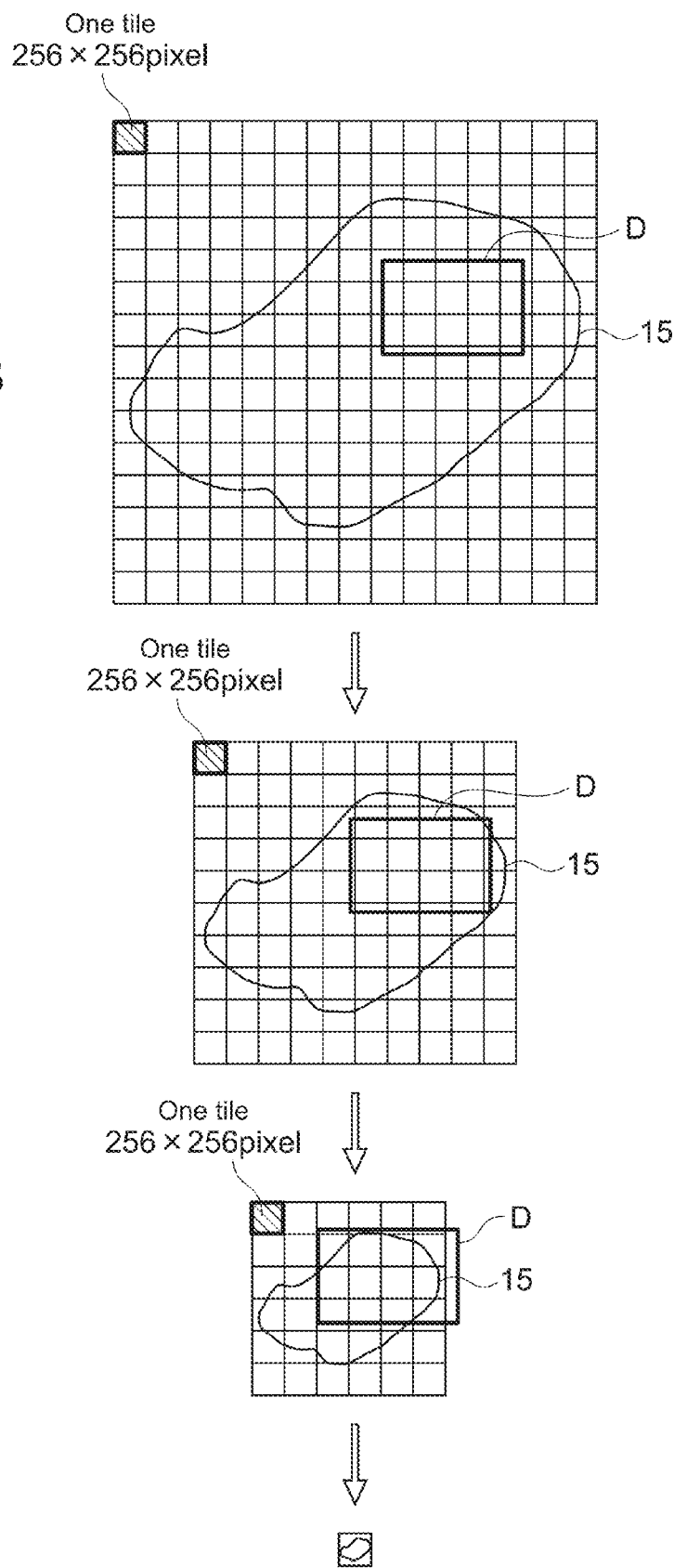
FIG. 3 is a diagram for describing a procedure for generating the image group of the image pyramid structure.
Figure 5:
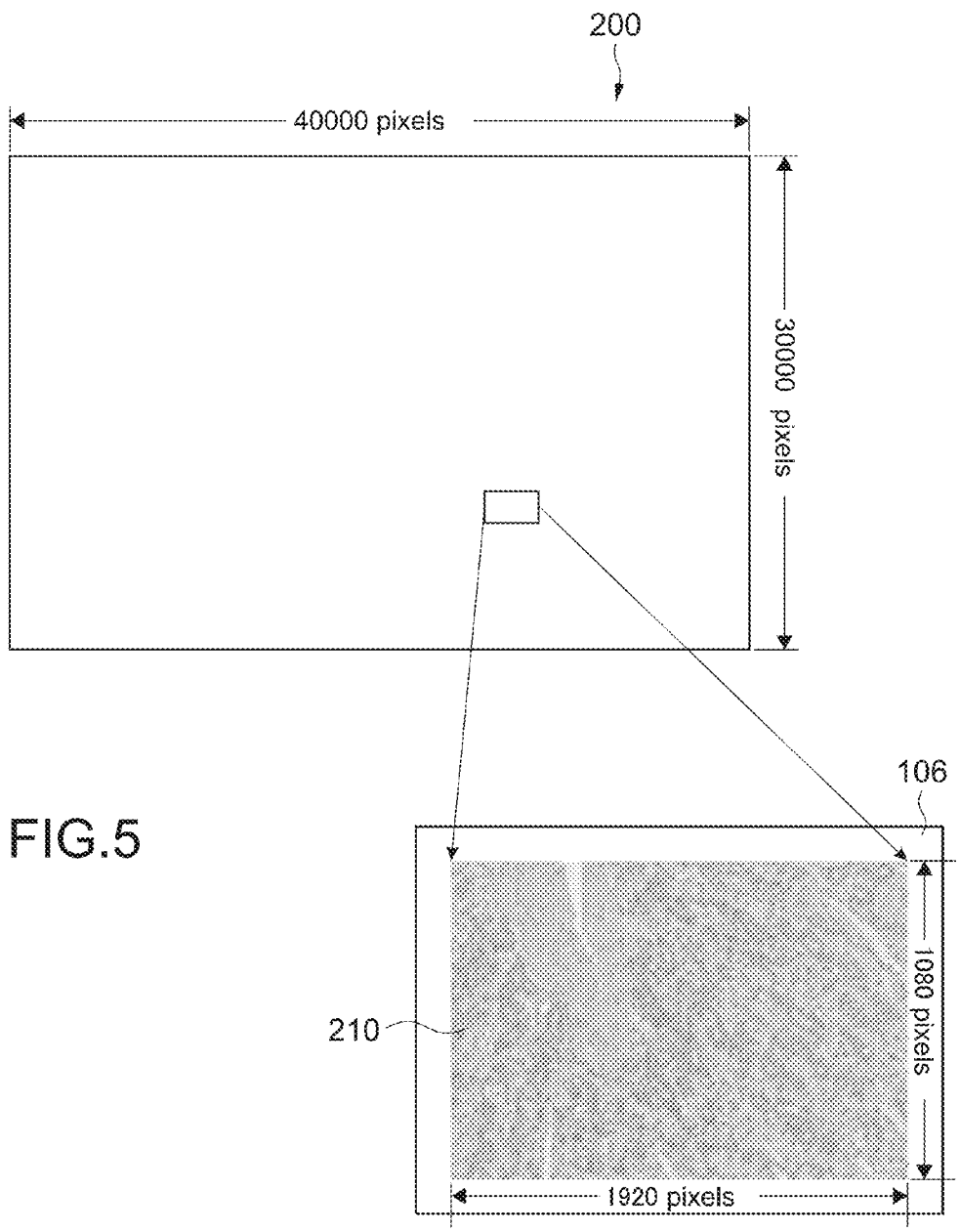
FIG. 5 is a diagram showing size examples of an entire image and a partial image.

An image pyramid structure 50 in this embodiment is an image group (entire image group) generated at a plurality of different resolutions with respect to a single image obtained by the optical microscope from a single observation target 15 (see FIG. 3). At the bottom of the image pyramid structure 50, a largest-size image is provided. At the top of the image pyramid structure 50, a smallest-size image is provided. The resolution of the largest-size image is, for example, 50*50 (kpixels: kilo pixels) or 30*40 (kpixels) as shown in FIG. 5. The resolution of the smallest-size image is, for example, 256*256 (pixels) or 256*512 (pixels).

Specifically, for example, when the single display unit 106 displays those images at 100% (displays each image with physical dots as many as the number of pixels of the image), the largest-size image is displayed as a largest one and the smallest-size image is displayed as a smallest one. Here, in FIG. 2, the display ranges of the display unit 106 are indicated by D.

FIG. 3 is a diagram for describing a procedure for generating the image group of the image pyramid structure 50.

First, a digital image of an original image (huge image) obtained by the optical microscope (not shown) at a predetermined observation magnification is prepared. This original image corresponds to the largest-size image being the image at the bottom of the image pyramid structure 50 shown in FIG. 2. That is, the original image is an image having a highest resolution. Therefore, as the image at the bottom of the image pyramid structure 50, an image observed and obtained by the optical microscope at a relatively high magnification is used.

It should be noted that, in the field of pathology, one obtained by slicing an organ, a tissue, a cell of a living body, or a part of them generally becomes the observation target 15. Then, a scanner apparatus (not shown) having functions of the optical microscope scans the observation target 15 sandwiched between glass slides and the digital image thus obtained is stored in this scanner apparatus or another storage apparatus.

The scanner apparatus or a general-purpose computer (not shown) generates a plurality of images from the largest-size image, which has been obtained in the above-mentioned manner, by gradually decreasing the resolution as shown in FIG. 3 and stores the generated images in, for example, a "tile" unit being a predetermined size unit. The size of a single tile is, for example, 256*256 (pixels). The image group thus generated forms the image pyramid structure 50 and this image pyramid structure 50 is stored in the storage unit 108 of the PC 100. Actually, the PC 100 only needs to store the images having a plurality of different resolutions and information on the resolutions while associating each image with information on its resolution. It should be noted that the generation and storage of the image pyramid structure 50 may be executed by the PC 100 shown in FIG. 1.

The entire image group that forms the image pyramid structure 50 may be generated by a known compression method or may be generated by a known compression method applied for generating a thumbnail image, for example.

Using software adopting the system of the image pyramid structure 50, the PC 100 extracts, according to information on an input operation by the user via the input unit 107, a desired image from the image pyramid structure 50 and outputs this image to the display unit 106. Specifically, the PC 100 displays an image of an arbitrary part of an image having an arbitrary resolution selected by the user, the image of the arbitrary part being specified by the user. In this case, at least one of the CPU 101, the input/output interface 105, and the display unit 106 functions as an output unit that outputs the image of the arbitrary part to the outside for displaying it on the display unit 106. Further, the CPU 101 or the input/output interface 105 functions as an acquisition unit that acquires the information on the input operation by the user.

For example, as shown in FIG. 5, an image 210 being a part of an entire image 200 having an arbitrary resolution among the entire images having a plurality of different resolutions is specified by an input operation by the user. The PC 100 includes the entire images 200 having a plurality of different resolutions as described above. When the input operation by the user specifies the image 210, the PC 100 is able to cut out the image in the specified area as the partial image 210 and to output the partial image 210 to the display unit 106.

In the example shown in FIG. 5, the partial image 210 is cut out from the largest-size original image and the display unit 106 displays the cut-out partial image 210 on the entire screen of the display unit 106, for example, using HD (high definition).

The display unit 106 is capable of displaying the partial image 210 having an arbitrary resolution. The resolution of the partial image 210 depends on the resolution of the entire image being the original image to be cut out. As a matter of course, the display unit 106 may display the cut-out partial image in a part of the entire screen of the display unit 106.

The above-mentioned processing enables the user to feel as if the user observes the observation target 15 while changing the observation magnification. In other words, the PC 100 functions as a virtual microscope. Here, the virtual observation magnification corresponds to the resolution in reality.

[Record Processing of Mark Information by PC as Mark Information Recording Apparatus]

The present application is a application of associating mark information with information on a position (coordinate) of the partial image 210 within the entire image and information on its resolution, the partial image 210 being to be output to the display unit 106.

Hereinafter, record processing of the mark information by the PC 100 will be described. The mark information is a symbol, a sign, an index, annotation information, or an image expressing them.

The annotation information is information constituted of a text, an audio, an image, a link (e.g., URL: uniform resource locator), or the like, and may be associated with the above-mentioned symbol, sign, index, and the like.

Hereinafter, on the assumption that the mark information is an image to be combined in the annotation information (in particular, audio information constituted of speech of user) and the partial image 210, the record processing thereof will be described. That is the case with a description of "presentation processing of mark information."

It should be noted that the processing by the PC 100, which will be described later, is realized by a cooperation of software stored in the storage unit 108, the ROM 102, or the like with a hardware resource of the PC 100. Specifically, by the CPU 101 loading programs that configure the software stored in the storage unit 108, the ROM 102, and the like into the RAM 103 and executing the programs, the following processing is realized. For the sake of description, on the assumption that a subject that executes the processing is the CPU 101, the processing will be described. That is the case with the description of "presentation processing of mark information."

First Embodiment of Record Processing

Figure 6:
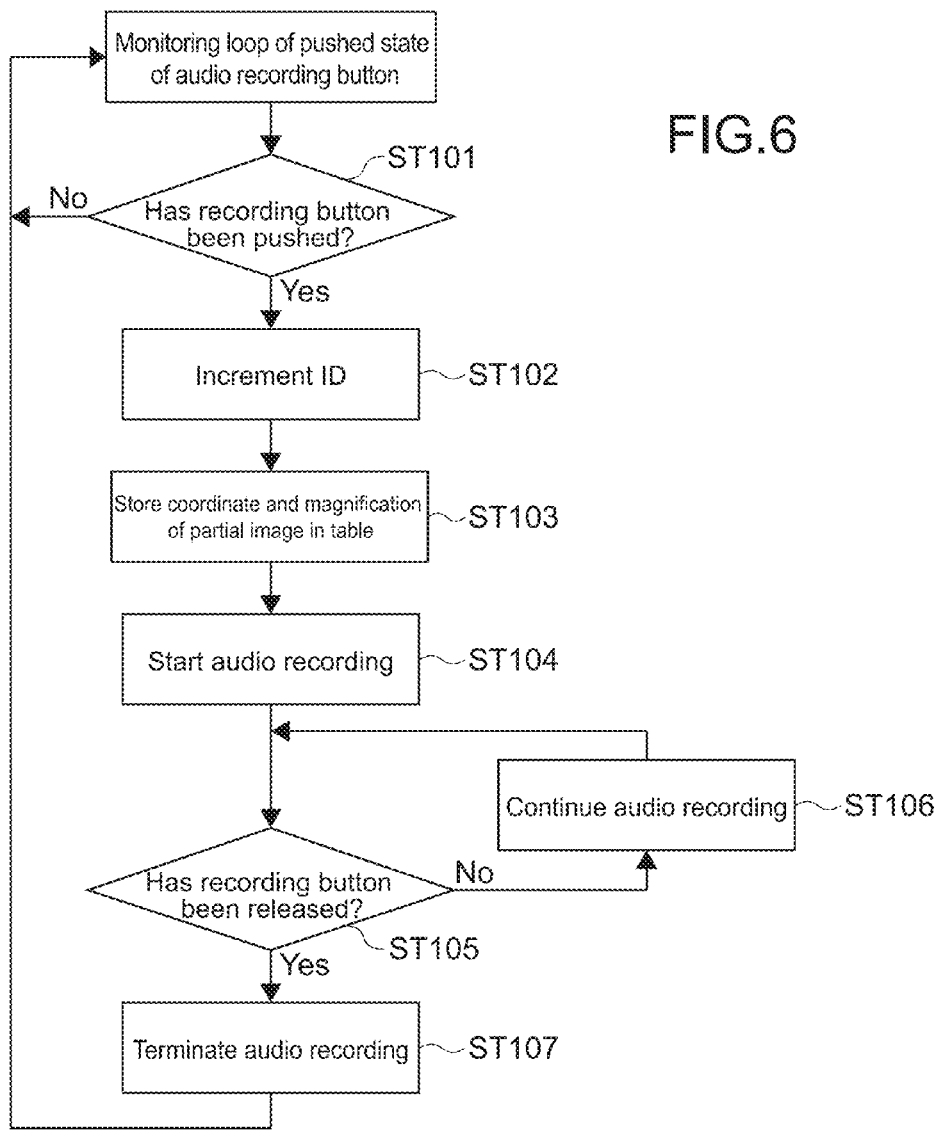
FIG. 6 is a flowchart showing record processing according to a first embodiment of record processing.

FIG. 6 is a flowchart showing record processing according to a first embodiment.

According to an input operation by the user using the arrow keys 2 of the controller 1, for example, the CPU 101 performs pan, zoom-in, and zoom-out within the entire image 200, and the user searches for the partial image 210 that the user has been observed. Here, pan refers to a movement of a specified area (display area) in the display unit 106, the movement having a component in at least one direction of horizontal and vertical directions.

Hereinafter, at least one processing of pan, zoom-in, and zoom-out within the entire image 200 by the CPU 101 is referred to as specification processing. Specifically, the CPU 101 outputs, every time the CPU 101 executes the specification processing, the partial image 210 to the display unit 106. Although described above, the specified area refers to an area constituting the partial image 210 within the entire image 200, the partial image 210 being to be output to the display unit 106 by the specification processing.

The CPU 101 executes the specification processing according to the input operation by the user as described above. Then, when the CPU 101 displays the partial image 210 that the user desires to observe, the user pushes, using the controller 1, the push button A serving as a recording button. In response to this operation, the CPU 101 starts the record processing of an audio (Step 101). The CPU 101 increments an ID that identifies recorded audio information (Step 102). Further, the CPU 101 stores, in a table shown in FIG. 7, information on a position (coordinate) of the partial image 210 within the entire image 200 and its observation magnification (hereinafter, simply referred to as magnification) while associating them with the ID (Step 103), the partial image 210 being output for display when the record processing is started. Then, the CPU 101 starts processing of recording the audio information on the speech of the user, which is input via the microphone, in the storage unit 108 or the like (Step 104). In this case, the CPU 101 functions as an annotation information generation unit.

The CPU 101 records the audio information while associating the audio information with (the ID, the position information, and the resolution information on) the partial image 210. In this case, the CPU 101 functions as a recording unit.

A coordinate (representative coordinate) indicating the partial image 210 recorded in the table only needs to be a coordinate at a predetermined position of a coordinate group constituting the partial image 210. For example, the coordinate is a coordinate at a center position, a coordinate at a most-upper left position, or a coordinate at another predetermined position of the partial image 210.

While the push button A is being pushed (No in Step 105), the CPU 101 continues the record processing (Step 106). When the user releases the finger from the push button A, the CPU 101 terminates the record processing of the audio (Step 107).

Figures 7, 8A, 8B:
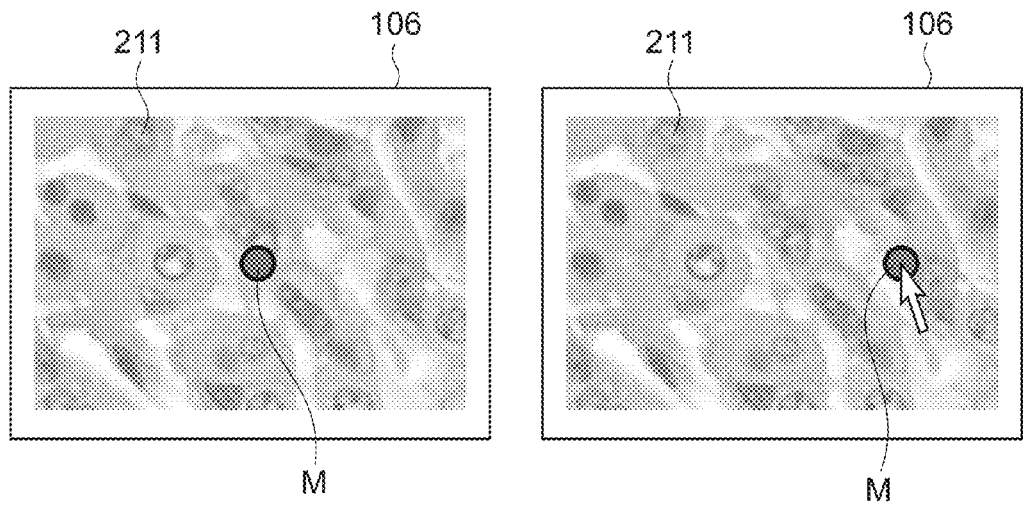
FIG. 7 is a table created by the record processing according to the first embodiment.
FIG. 8A shows an example of a screen displayed on a display unit when audio information is recorded.
FIG. 8B shows a modified example of the screen.

FIG. 8A shows an example of a screen displayed on the display unit 106 when the audio information is recorded.

When the record processing of the audio information is started or terminated, the CPU 101 combines, in the partial image 211 recorded in, for example, the table, a mark image M identifying the annotation information and associates the mark image M with the ID of the partial image 211 as shown in FIG. 7. Form information on the mark image M shown in FIGS. 7 and 8A is information of blue and circle shape.

As the form of the mark image M, other colors and shapes may be adopted. Further, the form of the mark image M may vary depending on each user. Alternatively, the form of the mark image M may vary depending on whether it indicates the audio information or other annotation information (e.g., link image or text information), i.e., depending on an annotation information type. Alternatively, the form of the mark image M may vary depending on a priority, which will be described later.

The CPU 101 combines the mark image M at a predetermined position, e.g., a center position in the partial image 211. A coordinate of the position at which the mark image M is combined may be the above-mentioned coordinate indicating the partial image 210 (representative coordinate recorded in table).

Alternatively, as shown in FIG. 8B, the mark image M may be combined at a coordinate of an arbitrary position in the partial image 210, that the user specifies with a pointer (or by a touch operation with respect to the screen). In this case, coordinate information on the mark image M may be also stored in the table shown in FIG. 7. The audio information may be associated with the coordinate of the mark image M.

As one of methods of presenting (e.g., reproducing) the recorded audio information to the user, the following processing is contemplated. For example, when, with respect to the position of the mark image M thus combined, the user makes an input operation such as a click (or touch), the CPU 101 reproduces the recorded audio information as will be described later. In this case, the mark image M functions a GUI (graphical user interface).

As described above, in this embodiment, the annotation information being the mark information is stored while being associated with the position information on the partial image 211 that has been output for display, and the information on the resolution of the partial image 211 (resolution of the entire image 200 including the partial image 211). Therefore, the CPU 101 is capable of adding the annotation information based on the coordinate of the partial image 210. Further, the CPU 101 is capable of adding the annotation information based on not only the coordinate of the partial image 210 but also the magnification thereof.

Further, in this embodiment, since the record processing is started based on the information on the operation made by the user with respect to the controller 1, it is possible for the user to record the audio information when the user desires.

In the above description, when the user releases the finger from the push button A, the record processing is terminated. However, the record processing may be executed using a toggle function. Specifically, for example, when the user may first push the push button A, the recording may be started, and when the user may re-push the same push button A, the recording may be terminated. Alternatively, using separate push buttons, the start and end of the recording may be executed.

Second Embodiment of Record Processing

Figure 9:
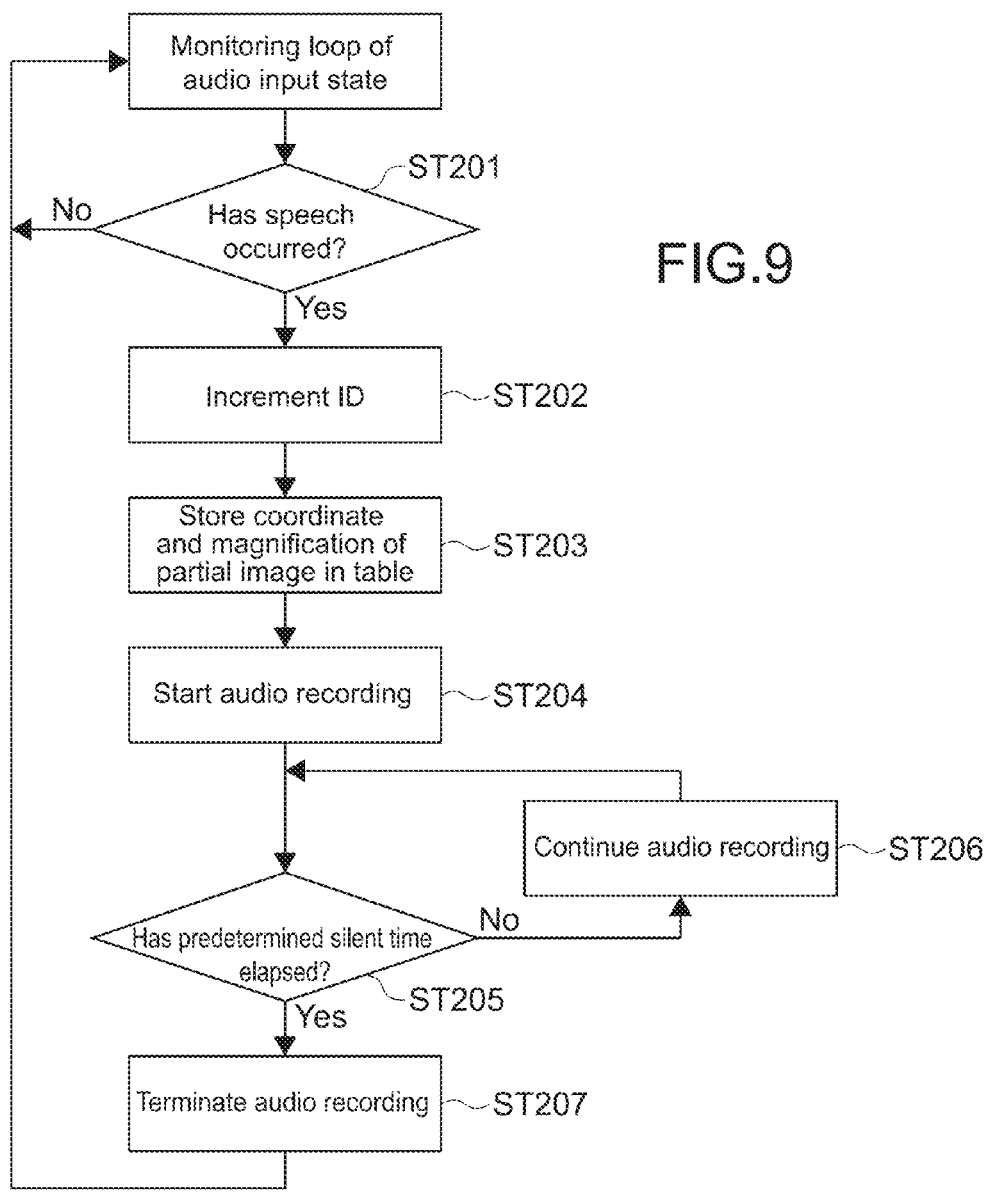
FIG. 9 is a flowchart showing record processing according to a second embodiment.

FIG. 9 is a flowchart showing record processing according to a second embodiment. Regarding the following embodiments, descriptions of the processing same as that in the first embodiment described above will be simplified or omitted.

In this embodiment, the start of the speech of the user is detected by the microphone (not shown) (input unit 107) and the detection is set as a trigger for starting the record processing.

According to an input operation by the user, the CPU 101 performs the specification processing and displays the partial image that the user desires to observe. Here, when the speech of the user occurs (Yes in Step 201), the ID is incremented (Step 202). The coordinate and the information on the magnification of the partial image 210 being displayed on the display unit 106 are stored in the table (see FIG. 7) while being associated with the ID (Step 203). In Step 201, for example, when an input of an audio having a sound pressure level above a threshold is made, the CPU 101 may determine that the speech of the user occurs.

When a silent period continues for a predetermined period of time (Yes in Step 205), the CPU 101 terminates the record processing (Step 207). The silent period is set as a period in which, for example, an input of an audio having a sound pressure level equal to or smaller than the above-mentioned threshold is made.

As described above, not using the conscious input operation by the user with respect to the controller 1, but using the start of the speech of the user as a trigger, it is possible to start the record processing of the audio information. With this, operability for the user is enhanced and it is possible to easily record an audio.

The PC 100 may include a program by which a predetermined word(s), for example, "start recording" or "start," in the speech of the user is registered in advance and when the user says this word, Yes is determined in Step 201 using this word as a trigger. In this case, also regarding Step 207, the PC 100 may include a program by which when the user says a registered word, the processing of Step 207 is executed using this word as a trigger.

Third Embodiment of Record Processing

Figure 10:
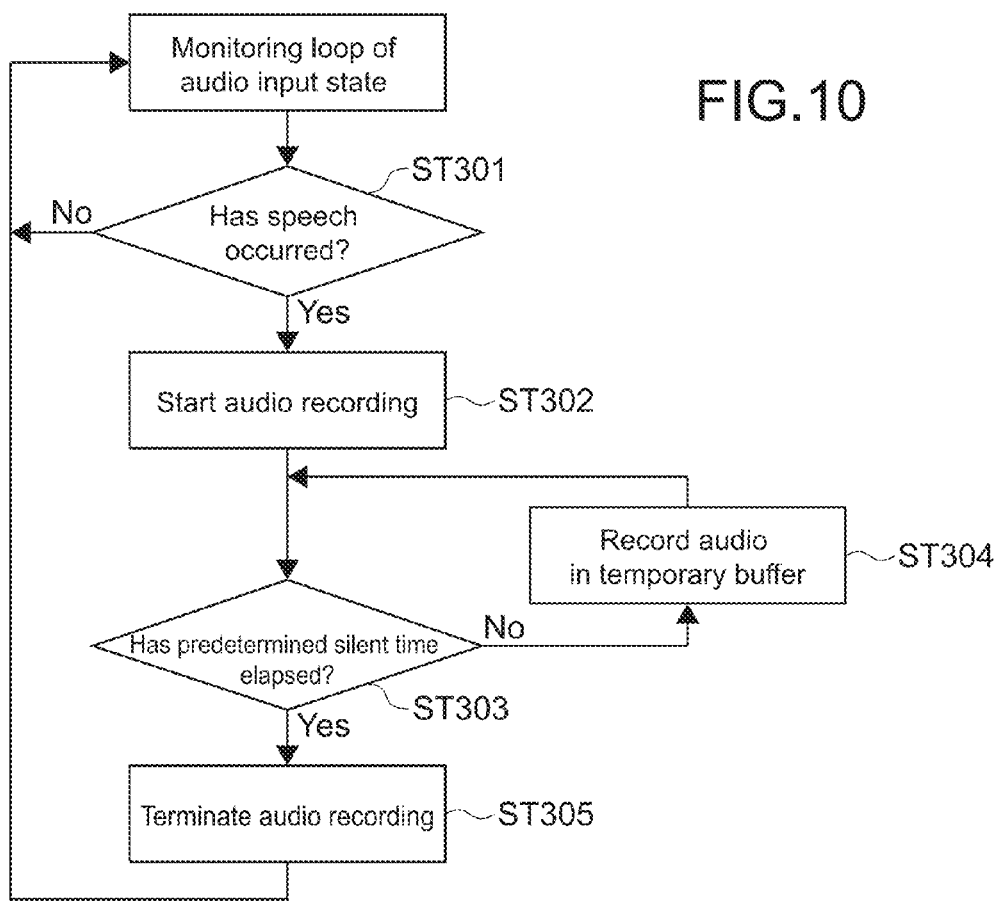
FIG. 10 is a flowchart showing record processing according to a third embodiment.
Figure 11:
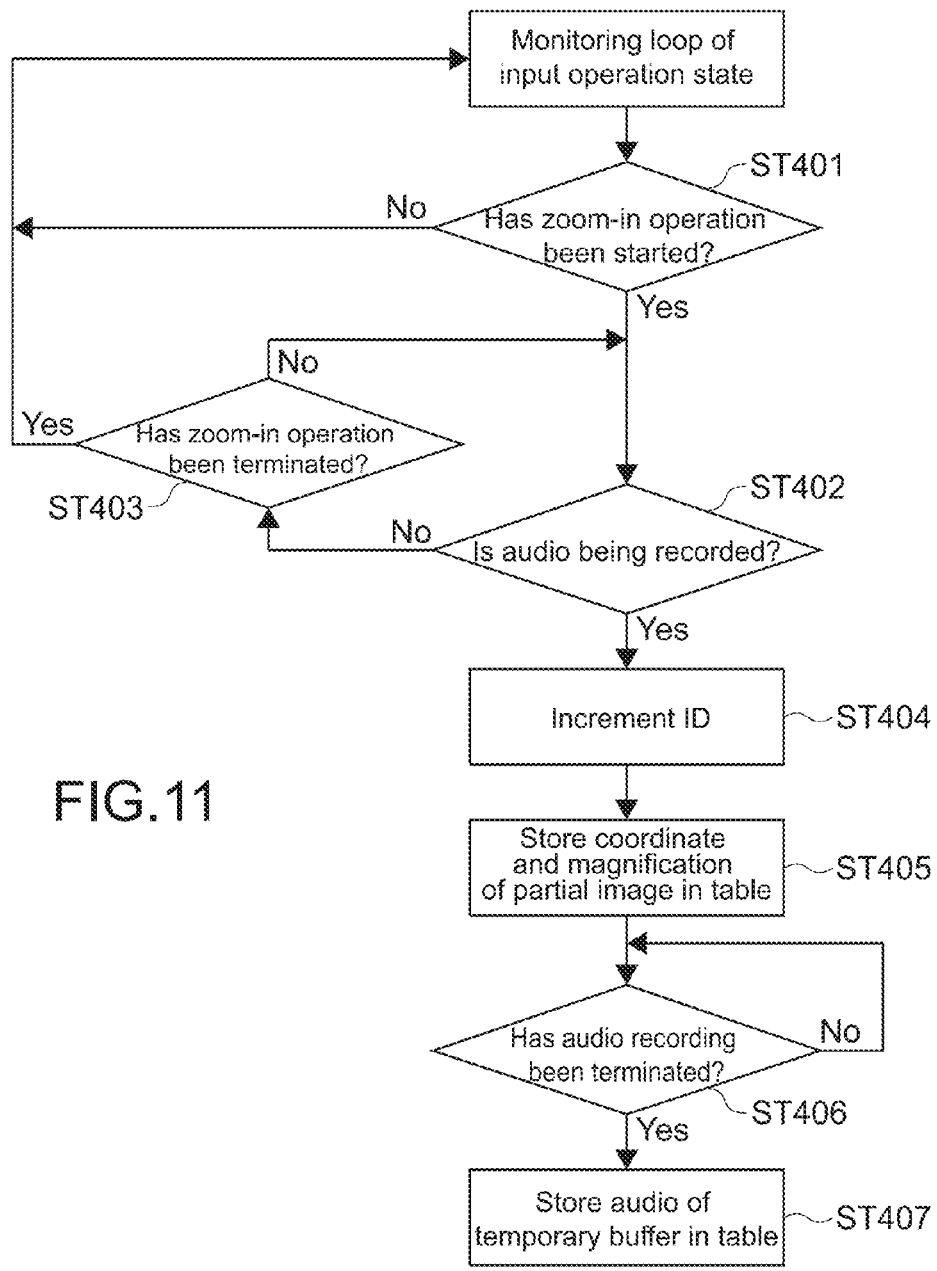
FIG. 11 is a flowchart showing record processing according to the third embodiment.

FIGS. 10 and 11 are flowcharts each showing record processing according to a third embodiment.

In this embodiment, when, in the middle of recording the speech of the user, the user makes a predetermined input operation with respect to the input unit 107, the coordinate and the like of the partial image 210 to be output by the input operation are recorded according to information on the input operation.

As shown in FIG. 10, when the speech of the user occurs (Yes in Step 301), the CPU 101 starts the record processing of the audio of the speech (Step 302). When the silent period does not continue for the predetermined period of time (No in Step 303), the CPU 101 records the audio information in a temporary buffer being a kind of memory included in the PC 100 (Step 304). When the silent period continues for the predetermined period of time (Yes in Step 303), the CPU 101 terminates the record processing of the audio (Step 305).

Criteria for the determinations in Steps 301 and 303 are the same as those in Steps 201 and 205 described above, respectively.

Subsequently, with a monitoring loop of an audio input state as shown in FIG. 10 being executed, a monitoring loop of an input operation state of the user is executed as shown in FIG. 11.

The CPU 101 determines whether or not a zoom-in (enlargement) operation of the screen is started as the predetermined input operation by the user (Step 401). When the zoom-in operation is started, the CPU 101 determines in the monitoring loop processing of the audio input state shown in FIG. 10 whether or not the audio is being recorded (Step 402). When the audio is not being recorded (No in Step 402) and the zoom-in operation is terminated (Yes in Step 403), the CPU 101 returns to Step 401.

When, in Step 402, the audio is being recorded, the CPU 101 increments the ID (Step 404) and stores the coordinate and the magnification of the partial image 210, which is being output for display, together with the ID in the table shown in FIG. 7 (Step 405).

The CPU 101 determines in the monitoring loop processing of the audio input state shown in FIG. 10 whether or not the audio is being recorded (whether or not the record processing of the audio is terminated) (Step 406). When the record processing is terminated, the CPU 101 stores the audio information, which has been temporarily stored in the temporary buffer, in the table shown in FIG. 7 while associating the audio information with the ID and the like (Step 407).

In this embodiment, the CPU 101 only needs to record, in Step 407, the audio information temporarily stored from Step 401 to Step 406. Alternatively, the CPU 101 only needs to record the audio information temporarily stored from a time at which a predetermined time has elapsed (e.g., one to ten seconds) after Step 401 to Step 406. Alternatively, the CPU 101 may record the audio information temporarily stored from before Step 401 to Step 406.

In this embodiment, when the user has made a zoom-in operation of input operations and the record processing of the audio is being executed, the partial image 210 displayed by the zoom-in operation may be recorded. When a zoom-in operation is made, the partial image 210 displayed by the zoom-in often includes an important point. Therefore, the processing according to this embodiment has a great merit.

The predetermined input operation to be a determination target in Steps 401 and 403 is not limited to the zoom-in operation, and may be a pointer or touch motion, for example, pan or zoom-out. Further, the PC 100 may include a program that allows the user to customize and set the predetermined input operation to be such a determination target.

Fourth Embodiment of Record Processing

Although not shown in the figures, the following processing may be realized.

For example, if the CPU 101 does not execute the monitoring loop of the audio input state as shown in FIG. 10, the CPU 101 may start the record processing immediately after a predetermined input operation (e.g., zoom-in operation as described above) by the user is started or after a predetermined time (e.g., one to ten seconds) has elapsed from the start of the predetermined input operation. In this case, a method of terminating the recording may be the method shown in FIG. 7 or 9.

Fifth Embodiment of Record Processing

Figure 12:
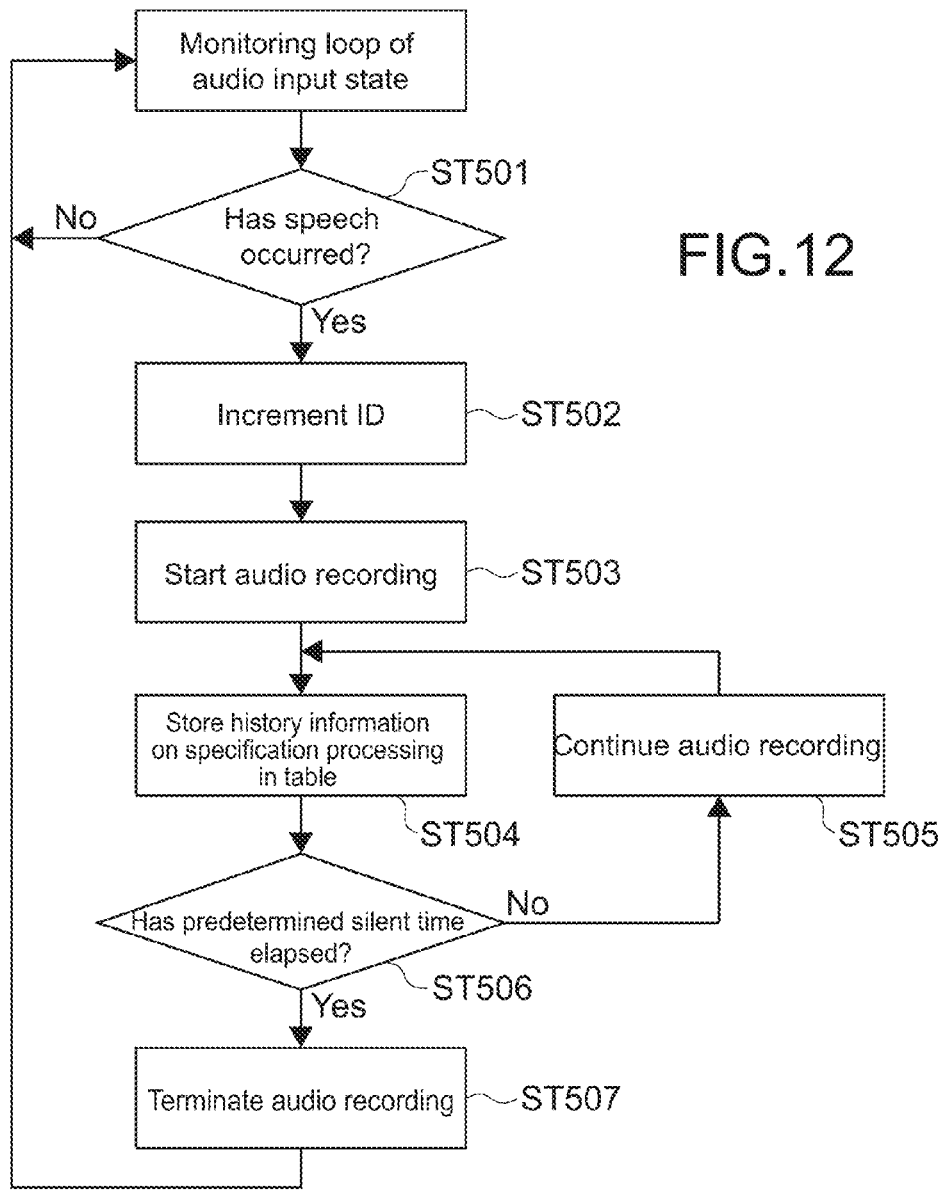
FIG. 12 is a flowchart showing record processing according to a fifth embodiment.

FIG. 12 is a flowchart showing record processing according to a fifth embodiment.

Figures 14, 15:
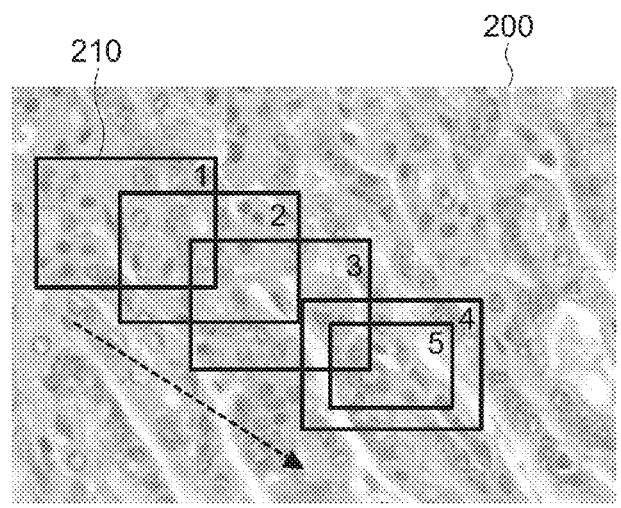
FIG. 14 is a diagram showing movement of a plurality of partial images regarding the history information in the fifth embodiment.
FIG. 15 is a table created by record processing according to a sixth embodiment.

The processing of this embodiment is processing in which, as shown in FIG. 14, a plurality of partial images 210 output by a series of continuous or intermittent input operations by the user are recorded and the partial images 210 are associated with audio information. FIG. 14 shows an example in which a series of input operations by the user successively outputs images of specified areas 1 to 5. Regarding the specified areas 1 to 4, they have the same magnification and the partial images thereof have different coordinates. A center coordinate of the specified area 5 is the same as that of the specified area 4, and the specified areas 4 and 5 have a plurality of different magnifications (the specified area 5 has a higher magnification).

For example, when the speech of the user occurs, the CPU 101 increments the ID and starts the record processing of the audio (Step 501 to 503).

Here, the CPU 101 associates coordinate and resolution information on each of the plurality of different partial images 210 output according to information on the series of continuous or intermittent input operations by the user with the partial image 210 and records them as history information on the specification processing (Step 504). FIG. 13 shows a table of the history information on the specification processing. Thus, the plurality of different partial images and the audio information are associated with a single ID.

The plurality of different partial images mean partial images different in at least one of the coordinate and the resolution.

When a silent period continues for a predetermined period of time (Yes in Step 506), the CPU 101 terminates the record processing (Step 507).

The information on the series of continuous or intermittent input operations refers to information on operations made by the user at a time interval within a predetermined time, which is set in advance or customizable by the user. Specifically, the time interval within the predetermined time refers to, if the user performs single pan within the entire image 200 and performs pan again, a time interval when no input operations for specifying an area are made by the user between the two pan operations.

The predetermined time is, for example, equal to or less than one second. Referring to FIG. 14, it is a time interval when the partial image 210 does not move between pan of the specified areas 1 to 2 and pan of the specified area 2 to 3, for example.

As described above, in this embodiment, for each piece of history information on the series of operations by the user for continuously outputting the plurality of different partial images 210, the audio information may be recorded.

In this embodiment, setting the occurrence of the speech as a trigger, the record processing is started. However, as shown in FIG. 7, when the user pushes the recording button, the record processing may be started and the history information may be associated with the audio information.

Sixth Embodiment of Record Processing

FIG. 15 is a table created by record processing according to a sixth embodiment.

In this embodiment, the CPU 101 associates each of IDs of a plurality of pieces of audio information being a plurality of pieces of annotation information with priority information indicating a priority for presenting (reproducing) the audio information. Thus, the CPU 101 is capable of reproducing at least one of the pieces of audio information in accordance with the set priority. The reproduction of the audio information according to the priority will be described in "presentation processing" below in detail.

Seventh Embodiment of Record Processing

In each of the above-mentioned embodiments, the partial image 210 that has been output for display on the display unit 106 has a single magnification value associated with the audio information in the table. However, upon recording of the audio information, the audio information may be associated with each of at least two or more magnification values (i.e., magnification ranges) including a magnification value of the partial image 210 that has been output for display on the display unit.

In other words, upon recording of the audio information, the CPU 101 associates the audio information with each magnification range including the magnification value of the partial image 210 that has been output for display. For example, the magnification of ID=1 shown in FIG. 7 is 20* magnification. It is the magnification of the partial image 210 output when the record processing of the audio information is started. In this case, in the table, a magnification range including 20* magnification, for example, a magnification range of 10 to 30* magnification, 5 to 40* magnification, or 20 to 40* magnification is recorded.

Accordingly, as will be described later, when the recorded audio information is reproduced, the CPU 101 is capable of performing the following processing. Specifically, when an image of a specified area including at least one coordinate of a coordinate group constituting the partial image is output for display at a magnification within its magnification range, the CPU 101 is capable of reproducing audio information associated with (the ID of) the partial image.

A trigger, a timing, and the like for starting and terminating the recording of the audio information of this embodiment may be the same as any one of those in the above-mentioned embodiments.

This embodiment may be applied to each of the above-mentioned embodiments shown in FIGS. 13 and 15.

Eighth Embodiment of Record Processing

Figures 16, 17:
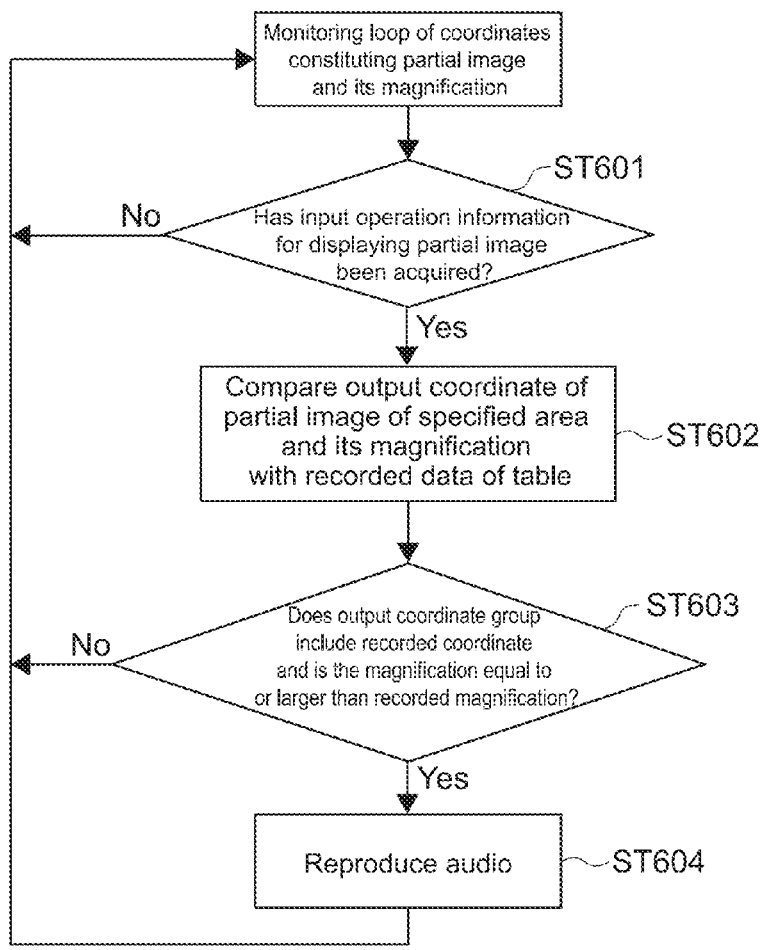
FIG. 16 is a table created by record processing according to an eighth embodiment.
FIG. 17 is a flowchart according to a first embodiment of presentation processing.

FIG. 16 shows a table created by record processing according to an eighth embodiment.

In this embodiment, for example, the user sets an arbitrary magnification threshold and the CPU 101 records the set magnification being the magnification threshold in the table. After the table as shown in FIG. 7 or the like has been created, the user may set a magnification and the CPU 101 may record the set magnification in the table any time. In such a case, the recorded original magnification may be overwritten.

Alternatively, the present disclosure is not limited to the case where the user sets a magnification, the CPU 101 may set a magnification in accordance with a predetermined algorithm, for example, at the start or end or in the middle of the record processing of the audio information or the like.

According to this embodiment, as will be described later, upon presentation of the mark information, for example, when a magnification of the partial image 210 to be output is equal to or larger than a set magnification, the mark information may be presented.

Other Embodiment of Record Processing

In each of the above-mentioned embodiments, a time stamp at least when the record processing has been executed (which may include a concept of day, month, and year), such as the start or end of the recording of the audio information, may be also associated with the ID and recorded.

[Presentation Processing of Mark Information by PC as Mark Information Presenting Apparatus]

Next, a description will be made of processing in which after the table has been created in the above-mentioned manner in each of the embodiments, the annotation information is presented by the PC to the user, the annotation information being one of the pieces of mark information recorded in the table. When performing this presentation processing, the CPU 101 functions as a processing unit.

First Embodiment of Presentation Processing

FIG. 17 shows a flowchart showing processing of presenting (reproducing) audio information as the annotation information based on recorded data in the table shown in FIG. 7, for example. The recorded data is, specifically, a coordinate, a magnification, and annotation information that have been recorded in the table. Hereinafter, the coordinate and magnification recorded in the table are referred to as a recorded coordinate (recorded position information) and a recorded magnification (recorded resolution information), respectively.

When an input operation by the user for displaying a partial image is being executed, the CPU 101 acquires information on the input operation (Yes in Step 601). In this case, the CPU 101 functions as an acquisition unit.

The CPU 101 compares a coordinate group (output coordinate group as output position information group) constituting a partial image of a specified area specified by the input operation and a magnification (output magnification as output resolution information) of the partial image with the recorded data in the table (Step 602).

When an output coordinate equal to the recorded coordinate in the table are present in the output coordinate group constituting the partial image 210 and the output magnification of the partial image 210 is equal to or larger than the recorded magnification in the table, the CPU 101 proceeds to Step 604 (Step 603).

In the case of Yes in Step 603, the CPU 101 executes processing for outputting audio data associated with an ID corresponding to the recorded magnification to a speaker (not shown) connected to the PC 100 (or installed in the PC), that is, reproduction processing (Step 604).

Figure 18A:
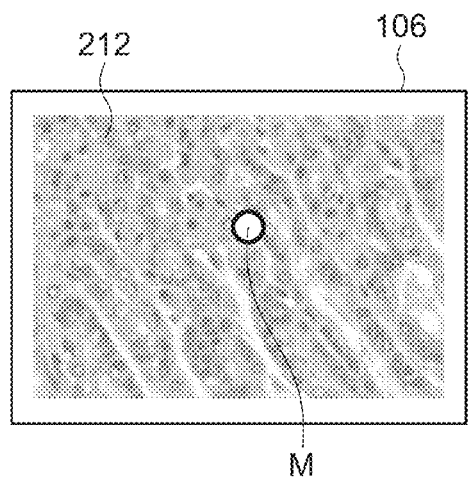
FIGS. 18A and 18B are diagrams each showing a partial image in which a mark image is combined, which is obtained by the presentation processing according to the first embodiment.
Figure 18B:
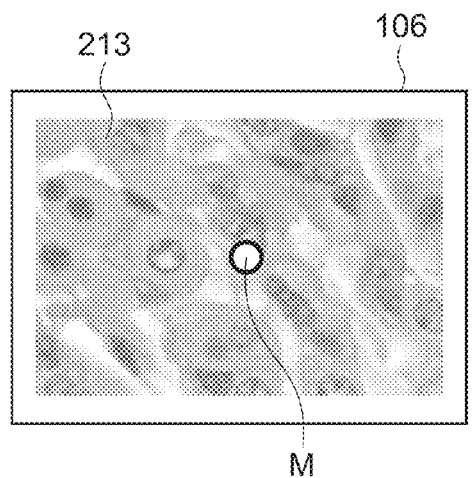

According to this embodiment, even if the CPU 101 combines, as shown in FIG. 18A, the recorded mark image M in the partial image 212 having a lower magnification and outputs it (see second embodiment described below), as long as the output magnification is not equal to (or not larger than) the recorded magnification, the CPU 101 does not reproduce the audio information. When as shown in FIG. 18B, the output magnification of the partial image 213 is equal to or larger than the recorded magnification, the audio information is reproduced.

For example, it is also possible to apply the seventh embodiment of record processing described above to this embodiment. Specifically, when the output magnification of the partial image of the specified area falls within the magnification range recorded in the table, the CPU 101 is capable of presenting at least one of the mark image M and the audio information that are associated with the magnification range. This concept is also applied to first to eight embodiments of presentation processing, which will be described later.

Such an operation that the user selects a particular part from a huge image being an observation target and the selected part is diagnosed is generally performed in a pathology diagnosis. In such circumstances, it is important to record the contents of diagnoses made by particularly professionals for respective partial images and reproduce them for an educational purpose or the like so that students can study how to make the diagnoses and the contents. Therefore, a voice memo as the mark information according to the present application is very useful. As described above, in the present application, when an input operation corresponding to a recorded input operation situation of the user (or input operation near this as will be described later) is made, a corresponding voice memo is reproduced, which is very convenient and has a great merit particularly in the field of pathology.

Second Embodiment of Presentation Processing

Figure 19:
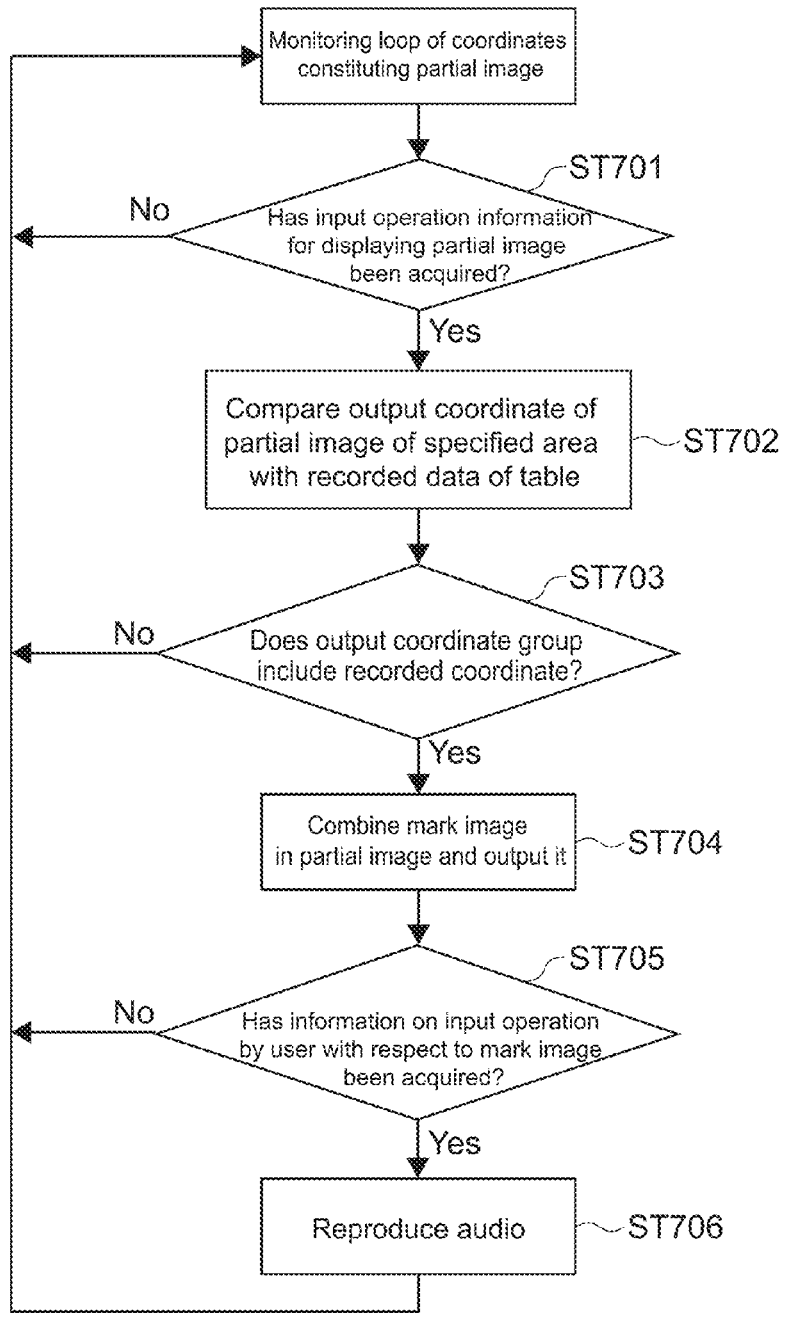
FIG. 19 is a flowchart showing presentation processing according to a second embodiment.

FIG. 19 shows a flowchart showing presentation processing according to a second embodiment.

In this embodiment, it is assumed that, for example, as shown in FIGS. 18A and 18B, the partial image 212 (213) in which the mark image M has been combined is being displayed. In Step 703, when a plurality of arbitrary coordinates in an output coordinate group of a partial image 214 are equal to a single recorded coordinate in the table, that is, when the output coordinate group includes the recorded coordinate, the CPU 101 combines the mark image M corresponding to the recorded coordinate in the partial image 212 (213) and outputs it (Step 704).

It is assumed that the CPU 101 has acquired information on an input operation by the user with respect to the mark image, such as a click of a GUI being the mark image, for example (Step 705). Then, irrespective of the recorded magnifications in the table, i.e., for any output magnifications, the CPU 101 reproduces audio information associated with the mark information operated by the user (Step 706).

According to this embodiment, irrespective of the recorded magnifications, it is possible to reproduce the audio information by the input operation with respect to the mark image M.

Third Embodiment of Presentation Processing

Figure 20:
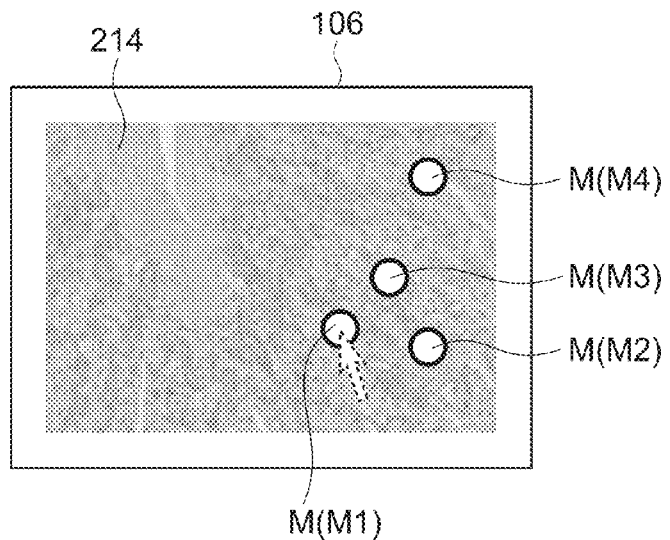
FIG. 20 is a diagram showing a partial image in which a mark image is combined, which is obtained by presentation processing according to a third embodiment.

By the algorithm described in the first and second embodiments of presentation processing above, the CPU 101 is also capable of combining, as shown in FIG. 20, a plurality of mark images M (M1 to M4) in the single partial image 214 output by the specification processing and outputting them. This embodiment is applied to a case where a plurality of recorded coordinates equal to a plurality of arbitrary coordinates in the output coordinate group of the partial image 214 and audio information each associated with them are present.

In this case, the CPU 101 may combine, in the partial image 214 to be output for display, mark images M corresponding to one or more IDs that include the plurality of recorded coordinates in the output coordinate group constituting the partial image 214 and that have recorded magnifications higher than an output magnification of the partial image 214. With this, the CPU 101 is capable of displaying, when the output magnification of the partial image becomes larger than a certain recorded magnification, the mark image M associated with the ID having a recorded magnification equal to or larger than the recorded magnification or reproducing audio information associated with the mark image M.

Alternatively, when the plurality of mark images M are being displayed as shown in FIG. 20, if the CPU 101 acquires information on an input operation (e.g., click) by the user with respect to one mark image M1 of the plurality of mark images M, the CPU 101 may reproduce audio information associated with the mark image M1.

Figure 21:
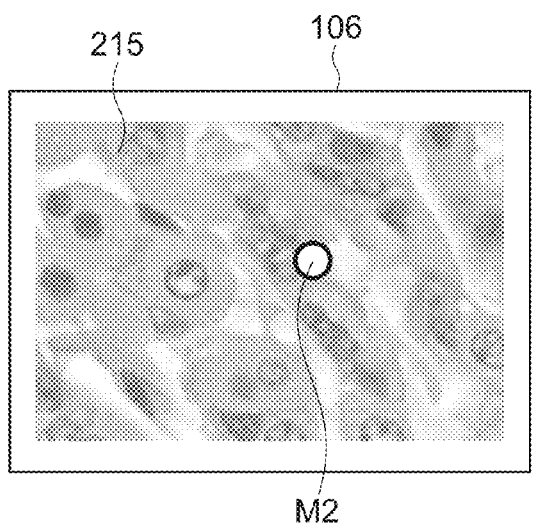
FIG. 21 is a diagram showing a partial image in which a mark image is combined, which is obtained by the presentation processing according to the third embodiment.

Alternatively, the CPU 101 may perform the following processing. Specifically, the CPU 101 determines a correspondence between the output magnification and each of the recorded magnifications corresponding to the plurality of recorded coordinates. In this case, even if the partial image 214 includes the plurality of recorded coordinates as shown in FIG. 20, the CPU 101 is capable of reproducing audio information corresponding to an ID having a recorded magnification equal to the output magnification. In this case, for example, when the user makes an input operation for increasing the magnification of the partial image 214, the CPU 101 may combine, as shown in FIG. 21, only a mark image M2 corresponding to the recorded magnification equal to the magnification of a partial image 215, in the partial image 215. In other words, the mark images M1, M3, and M4 corresponding to other recorded magnifications are not displayed.

Fourth Embodiment of Presentation Processing

Figure 22:
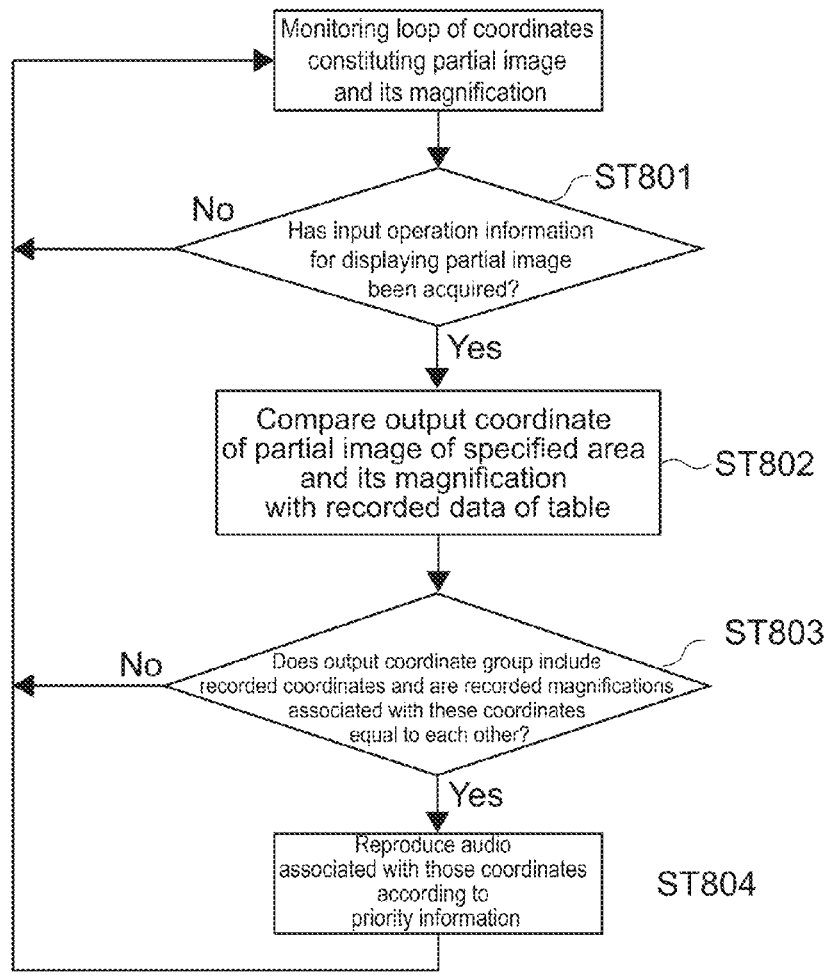
FIG. 22 is a flowchart showing presentation processing according to a fourth embodiment.

FIG. 22 shows a flowchart showing presentation processing according to a fourth embodiment.

This embodiment is applied to, for example, a case where the output coordinate group of the single partial image 210 includes the plurality of recorded coordinates and the recorded magnifications (or recorded magnification ranges being recorded resolution ranges) associated with the plurality of recorded coordinates are equal to each other.

Specifically, in Step 803 shown in FIG. 22, the CPU 101 determines whether or not the plurality of recorded coordinates equal to a plurality of arbitrary coordinates in the output coordinate group are present and the recorded magnifications (or recorded magnification ranges) associated with the plurality of recorded coordinates are equal to each other. In the case of Yes in Step 803, the CPU 101 executes processing for presenting at least one of a plurality of pieces of audio information associated with the plurality of recorded coordinates in accordance with priority information recorded in the table in FIG. 15, that is, reproduces the piece of audio information (Step 804).

The CPU 101 uses the priority upon reproduction of the audio information as an index defined as follows, for example.
(1) Index indicating a reproduction time order of audio information or index for determining whether or not to reproduce the audio information
(2) Index for reproducing audio information associated with even a partial image being displayed at a low magnification The meaning of "priority" can be diversely construed from user's perspective. For example, the priority may mean which (reproduction of audio information recorded by) user among a plurality of users is prioritized. Alternatively, the priority may mean a priority depending on importance (e.g., importance from medical viewpoint) of the recorded audio information or the recorded partial image 210.

The priority is typically set by the user, but may be automatically set by the PC 100. In the case where the PC 100 automatically sets a priority, the priority may be a time-series order of recording the mark information, for example.

As in (1) above, in the case where the priority is used as the index indicating the reproduction order and time stamps are recorded in the table, irrespective of the time stamps, according to a reproduction order priority, the audio information is reproduced.

In the case where (1) above is applied as priority definition, in Step 804, the CPU 101 reproduces pieces of audio information in a descending priority order.

In the case where (1) above is applied, the CPU 101 is also capable of reproducing audio information having a highest priority (or pieces of audio information having one or more gradual priorities including a highest priority) without reproducing other audio information.

In the case where (2) above is applied as the priority definition, the CPU 101 executes the following processing. The CPU 101 records pieces of audio information in the table while associating the pieces of audio information with magnification ranges including an output magnification of the partial image 210 and sets different magnification ranges for different priority information of the pieces of audio information.

In this case, in Step 804, the CPU 101 reproduces at least one of the plurality of pieces of audio information associated with the plurality of recorded coordinates in the output coordinate group, in accordance with the individually-set recorded magnification ranges described above. In this case, for example, it is possible to set a recorded magnification range to be larger as the priority becomes higher. With this, even in the case of the partial image 210 being displayed at a low magnification, as long as the partial image 210 has a high priority, audio information associated with the partial image 210 is reproduced.

As described above, in this embodiment, it is possible to present the audio information to the user in the descending priority order.

It should be noted that in the fourth embodiment, when the recorded magnification ranges corresponding to the plurality of recorded coordinates partially overlap with each other, the mark information may be presented according to the priority.

Fifth Embodiment of Presentation Processing

As in the fourth embodiment, this embodiment is applied to the case where the output coordinate group of the single partial image 210 includes the plurality of recorded coordinates and the recorded magnifications (or recorded magnification ranges) associated with the plurality of recorded coordinates are equal to each other. In this case, as in the fourth embodiment, in accordance with the priority information shown in FIG. 15, the audio information is reproduced. A application not described in the fourth embodiment is as follows.

In this embodiment, for example, as shown in FIG. 23A, the CPU 101 combines, in a partial image 216 having a relatively low output magnification, both mark images MG and MB in green and blue. Then, when, increasing the output magnification by an input operation by the user, the output magnification becomes equal to the recorded magnification corresponding to the mark images M, as shown in FIG. 23B, the CPU 101 combines only the mark image MB in blue, which has a higher priority among the two mark images M, in a partial image 217 and outputs it. At this time, the CPU 101 reproduces audio information associated with the mark image MB in blue.

Alternatively, when the partial image 217 is in the state shown in FIG. 23B, in the case where the CPU 101 acquires information on an input operation by the user with respect to the mark image MB (e.g., the user clicks it), the CPU 101 may reproduce the audio information.

By the way, if the output coordinate group of the single partial image 210 includes the plurality of recorded coordinates, the recorded magnifications thereof are equal to each other (or recorded magnification ranges overlap with each other), and further, priorities thereof are equal to each other, the CPU 101 may record, upon recording, different mark images M. In the example of the partial image 218 shown in FIG. 24, mark images MR and MY in two different colors (red and yellow) are combined. In this case, for example, the CPU 101 is also capable of reproducing audio information of the mark image MR in red prior to the mark image MY in yellow.

Sixth Embodiment of Presentation Processing

Presentation processing according to this embodiment is presentation processing when, as shown in FIG. 11, a predetermined input operation being one of the input operations by the user for displaying a partial image is made. When the processing shown in FIG. 11 is made, the CPU 101 records data as shown in ID=1 in FIG. 25. In other words, when acquiring information on a "zoom-in" operation as information on the predetermined input operation, the CPU 101 records a coordinate and a magnification of the partial image 210 being the zoom-in target image and associates audio information with the coordinate and the magnification of the partial image 210 and records it.

The presentation processing of the audio information in this case is processing as follows. The CPU 101 monitors the information on the input operation by the user for displaying the partial image 210 and the output coordinate of the partial image 210. When the output coordinate group constituting the partial image 210 that has been output for display includes the recorded coordinate associated with ID=1 and the input operation is zoom-in, the CPU 101 reproduces audio information associated with this recorded coordinate.

With this, irrespective of the recorded magnification, it is possible to reproduce the audio information when the zoom-in input operation is made.

For example, for an educational purpose, it is desirable that the user (student) make the operation same as an operation made by a recorder (teacher or the like) to find out an important point in a partial image. For such application, when the user makes an operation for displaying the partial image, the audio is not reproduced only by touching a recording point on a screen. Only after the user performs zoom-in, the audio is reproduced and it is determined that the user makes a correct operation. This configuration is not limited to the medical and pathological fields.

On the other hand, as a condition of reproducing the audio information, only after three conditions including the above-mentioned recorded magnification are satisfied, the audio information may be reproduced. Specifically, when the output coordinate group of the partial image 210 includes the recorded coordinate, the zoom-in operation is made, and further its output magnification is equal to the recorded magnification (or recorded magnification range), the CPU 101 may reproduce the audio information.

It should be noted that in the example shown in ID=2 in FIG. 25, not "zoom-in" but "pan" is set as the information on the predetermined input operation, for example, by user customization. In the case of "pan," for example, upon recording, a coordinate and a magnification of the partial image 210 immediately after the pan operation is terminated (partial image 210 displayed at end of pan operation) only need to be recorded in the table. When an input operation other than "zoom-in" and "zoom-out" operations is set as the predetermined input operation, a condition of reproducing the audio information is not limited to two conditions: correspondence of the recorded coordinate; and correspondence of the predetermined input operation. As the condition of reproducing the audio information, three conditions may be used as described above.

Seventh Embodiment of Presentation Processing

Figure 26:
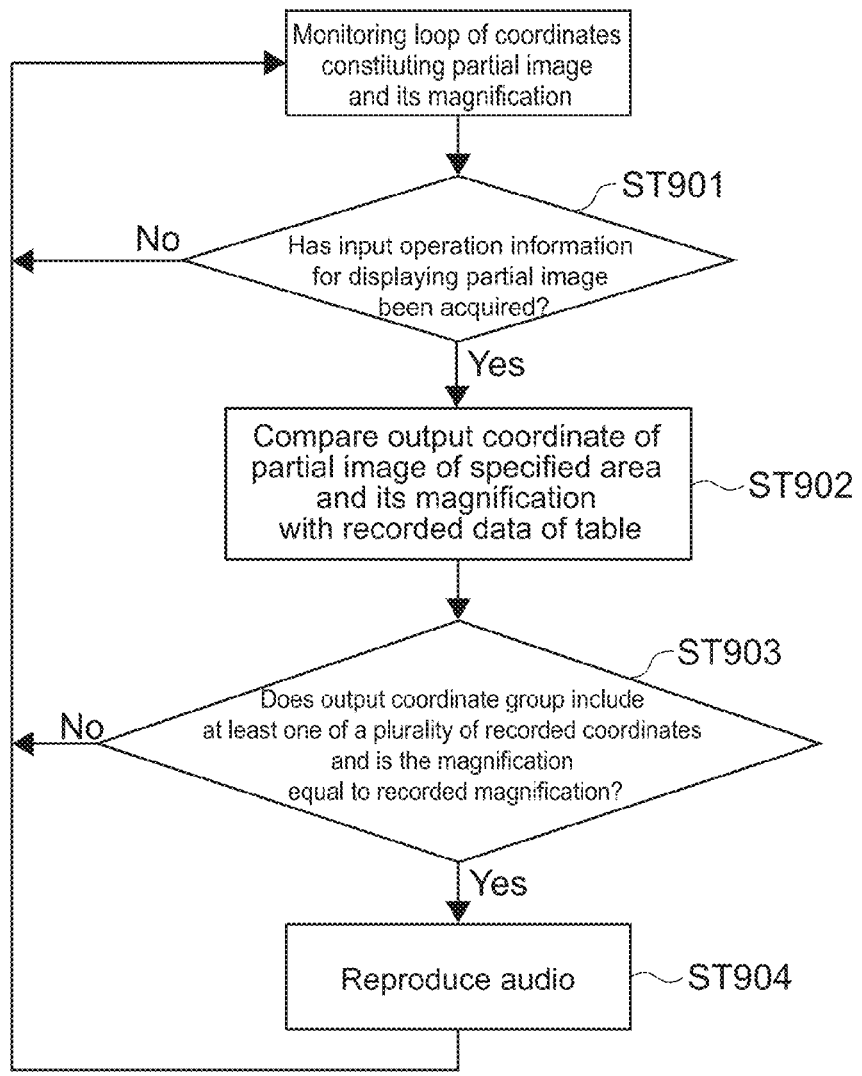
FIG. 26 is a flowchart showing presentation processing according to a seventh embodiment.

FIG. 26 shows a flowchart showing presentation processing according to a seventh embodiment. The presentation processing according to this embodiment is processing of reproducing, as shown in FIG. 12, audio information associated with history information being information on a series of continuous or intermittent input operations by the user.

While the user is making an input operation for displaying a partial image 210, the CPU 101 determines whether or not the output coordinate group constituting the partial image 210 of the specified area includes at least one recorded coordinate of the plurality of recorded coordinates in the table and its output magnification is equal to the recorded magnification corresponding to the recorded coordinate (or falls within recorded magnification range) (Step 903). In the case of Yes in Step 903, the CPU 101 reproduces audio information associated with an ID thereof (Step 904).

In other words, in this embodiment, when the information on the partial image 210, which is obtained by the input operation by the user, is included in the history information, the audio information is reproduced.

According to this embodiment, in such a manner that the partial image 210 that has been output for display in middle of recording the audio is displayed on the display unit 106 by the user making an input operation, it is possible to reproduce audio information associated with the partial image 210 from the start. That is, even if the partial image (partial image of "coordinate 1" in table shown in FIG. 13) that has been output at the start of the record processing of the audio is not displayed upon presentation, the audio is reproduced from the start, which is very convenient.

In this case, when reproducing the audio from the start, the CPU 101 may change the current screen to the partial image 210 output at the start of the record processing of the audio and display the partial image 210.

Alternatively, in the table shown in FIG. 13, when recording the audio, the CPU 101 may record audio data such that continuous audio data is divided to correspond to each of coordinates 1, 2, . . . . Accordingly, for example, when the partial image 210 displayed by an input operation by the user corresponds to a middle of the recording of the audio, it is possible to reproduce the audio from the middle of the recording.

In this embodiment, when the output coordinate group of the partial image 210 includes the recorded coordinate in the table, the audio information may be reproduced irrespective of the recorded magnification.

Eighth Embodiment of Presentation Processing

Figure 27:
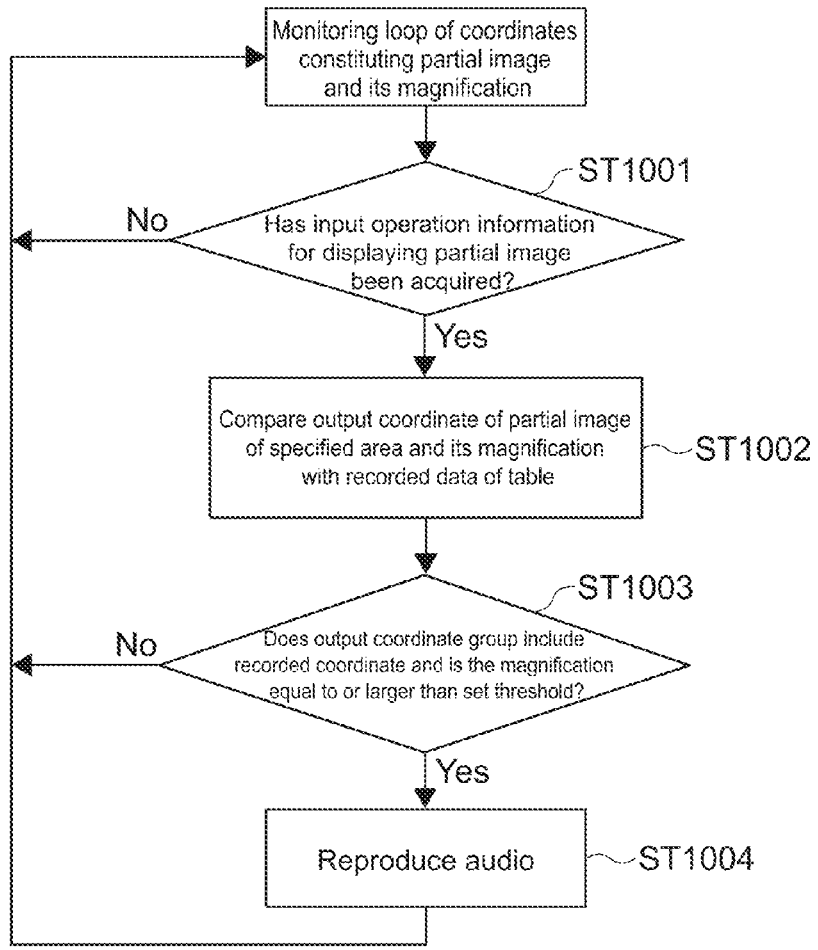
FIG. 27 is a flowchart showing the presentation processing according to the seventh embodiment.

FIG. 27 shows a flowchart showing presentation processing according to an eighth embodiment. The processing of this embodiment is presentation processing in the case where the magnification thresholds are set as shown in FIG. 16.

While the user is making an input operation for displaying a partial image 210, the CPU 101 determines whether or not the output coordinate group constituting the partial image 210 of the specified area includes at least one recorded coordinate of the plurality of recorded coordinates in the table and its output magnification is equal to or larger than its set magnification (Step 1003). In the case of Yes in Step 1003, the CPU 101 reproduces audio information associated with an ID thereof (Step 1004).

With this, only after the output magnification of the partial image 210 becomes equal to, for example, a magnification arbitrarily set by the user, it is possible to reproduce the audio information.

Other Embodiment of Presentation Processing

In each of the above-mentioned embodiments of presentation processing, for example, in each of Steps 604, 804, 904, and 1004 in FIGS. 17, 22, 26, and 27, the CPU 101 may execute, in addition to the step of reproducing the audio information, the step of displaying the associated mark image M.

Other Embodiment

The present application is not limited to the above-mentioned embodiments and other various embodiments may be realized.

In each of the above-mentioned embodiments, as the annotation information, mainly the audio information and the image such as the mark image M have been exemplified. However, in each of the above-mentioned embodiments, other types of annotation information described above may be created and presented.

The PC 100 may include a program by which, without an input operation by the user, a predetermined algorithm executes the specification processing and the partial image 210 is automatically cut out and output to the display unit 106. The PC 100 may include a program by which, without an input operation by the user, a predetermined algorithm automatically generates mark information and the mark information is associated with the output partial image 210.

In each of the above-mentioned embodiments, the user inputs the operation information into the PC 100 via the controller 1 shown in FIG. 4. However, other input devices such as a mouse and keyboard may be used as a matter of course.

Although in each of the above-mentioned embodiments, the audio information is generated by the user as the mark information, the mark information may be a symbol, a sign, an index, or other information that are included in the PC in advance.

The present application is not limited to the applications in the medical and pathological fields. As long as it is a field in which the partial image 210 is displayed at a plurality of different magnifications as an area specified within the huge entire image 200, the present application may be applicable to any fields. As such fields, the present application is applicable to not only biological, botanical, and bacteriological fields, but also geological, geophysical, and cosmic physical fields.

Among the features of the above-mentioned embodiments, at least two features may be combined together.

The present application may be configured as follows.

(1) A mark information recording apparatus, including:
an output unit configured to output, for displaying a partial image being a part of an entire image having an arbitrary resolution among entire images generated at a plurality of different resolutions with respect to a single target, the partial image; and
a recording unit configured to associate mark information with information on a position within the entire image and information on the resolution of the output partial image and record the mark information.

(2) The mark information recording apparatus according to (1), in which
the recording unit is configured to record, as the mark information, annotation information and a mark image to be combined in the partial image.

(3) The mark information recording apparatus according to (2), further including:
an annotation information generation unit configured to start, when information on an input operation by a user for starting generation of the annotation information is acquired, the generation of the annotation information.

(4) The mark information recording apparatus according to (2), further including:
an annotation information generation unit configured to start, when information on an audio of a speech of a user is acquired, generation of the annotation information.

(5) The mark information recording apparatus according to any one of (1) to (4), further including:
an acquisition unit configured to acquire information on an operation by a user for causing the output unit to output the partial image, in which
the recording unit is configured to associate the mark information with the position information and the resolution information on the partial image output by the output unit according to the operation information acquired by the acquisition unit.

(6) The mark information recording apparatus according to (5), in which
the recording unit is configured to associate position information and resolution information with each of partial images different in at least one of the position information and the resolution information, record information obtained by the association as output history information on each of the partial images, and associate the mark information with the history information, the partial images being output by the output unit according to information on a series of continuous or intermittent operations by the user that is acquired by the acquisition unit.

(7) The mark information recording apparatus according to (5) or (6), in which
the recording unit is configured to execute, when, out of the operation information acquired by the acquisition unit, predetermined operation information is acquired, the association processing of the mark information with respect to the partial image output according to the predetermined operation information.

(8) The mark information recording apparatus according to any one of (1) to (7), in which
the recording unit is configured to associate priority information indicating a priority upon presentation of each of a plurality of pieces of mark information with each of the plurality of pieces of mark information and record the priority information.

(9) The mark information recording apparatus according to any one of (1) to (8), in which
the recording unit is configured to associate, with each of at least two or more resolution ranges including the resolution of the partial image output by the output unit, the mark information.

(10) The mark information recording apparatus according to any one of (1) to (9), in which
the recording unit is configured to set a threshold of the resolution according to an operation by the user and to associate the set threshold of the resolution with the position information and the mark information and record the set threshold.

(11) A mark information presenting apparatus, including:
an output unit configured to output, for displaying a partial image being a part of an entire image having an arbitrary resolution among entire images generated at a plurality of different resolutions with respect to a single target, the partial image;
a recording unit configured to associate mark information with information on a position within the entire image and information on the resolution of the output partial image and record the position information and the resolution information that are associated with the mark information as recorded position information and recorded resolution information, respectively; and
a processing unit configured to execute, when an output position information group constituting the partial image to be output includes the recorded position information, processing for presenting the mark information associated with at least the recorded position information.

(12) The mark information presenting apparatus according to (11), in which
the processing unit is configured to execute, when the output position information group includes the recorded position information and a resolution of output resolution information of the partial image to be output by the output unit is equal to a resolution of the recorded resolution information corresponding to the recorded position information, processing for presenting the mark information associated with the recorded position information and the recorded resolution information.

(13) The mark information presenting apparatus according to (12), in which
the recording unit is configured to record, as the mark information, annotation information and a mark image to be combined in the partial image, and
the processing unit is configured to execute processing for presenting the annotation information.

(14) The mark information presenting apparatus according to (13), in which
the processing unit is configured to combine, when the output position information group constituting the partial image to be output includes a plurality of pieces of recorded position information, a plurality of mark images associated with the plurality of pieces of recorded position information, in the partial image to be output.

(15) The mark information presenting apparatus according to (14), in which
the processing unit is configured to combine, among a plurality of pieces of recorded resolution information associated with the plurality of pieces of recorded position information, one of an image having a resolution equal to the resolution of the output resolution information of the partial image to be output by the output unit and an image corresponding to resolution information including a resolution within a recorded resolution range, in the partial image to be output.

(16) The mark information presenting apparatus according to (14), in which
the recording unit is configured to associate priority information indicating a priority upon presentation of each of a plurality of pieces of annotation information corresponding to the plurality of images with a plurality of pieces of mark information and record the priority information, and
the processing unit is configured to set, according to the recorded priority information, one of whether or not to present the plurality of pieces of annotation information and a time order of presenting the plurality of pieces of annotation information.

(17) The mark information presenting apparatus according to (14), in which
the recording unit is configured to associate, with each of at least two or more resolution ranges including the resolution of the output resolution of the partial image output by the output unit, the annotation information and set a different recorded resolution range for each of different pieces of priority information, and
the processing unit is configured to execute processing for presenting at least one piece of annotation information among a plurality of pieces of annotation information according to the set recorded resolution range, the plurality of pieces of annotation information being associated with the plurality of pieces of recorded position information included in the output position information group.

(18) The mark information presenting apparatus according to any one of (11) to (17), further including:
an acquisition unit configured to acquire information on an operation by a user for causing the output unit to output the partial image, in which
the recording unit is configured to execute, when, out of the operation information acquired by the acquisition unit, predetermined operation information is acquired, the association processing of the mark information with respect to the partial image output according to the predetermined operation information, and
the processing unit is configured to execute, when an output position information group constituting the partial image output according to the predetermined operation information includes the recorded position information, processing for presenting the mark information associated with at least the recorded position information.

(19) A mark information recording method, including:
outputting, for displaying a partial image being a part of an entire image having an arbitrary resolution among entire images generated at a plurality of different resolutions with respect to a single target, the partial image; and
associating mark information with information on a position within the entire image and information on the resolution of the output partial image and recording the mark information.

(20) A mark information presenting method, including:
outputting, for displaying a partial image being a part of an entire image having an arbitrary resolution among entire images generated at a plurality of different resolutions with respect to a single target, the partial image;
associating mark information with information on a position within the entire image and information on the resolution of the output partial image and recording the position information and the resolution information that are associated with the mark information as recorded position information and recorded resolution information, respectively; and
executing, when an output position information group constituting the partial image to be output includes the recorded position information, processing for presenting the mark information associated with at least the recorded position information.

The above-mentioned mark information presenting apparatus may be configured as follows.

(21) The mark information presenting apparatus according to (18), in which
the recording unit is configured to associate position information and resolution information with each of partial images different in at least one of the position information and the resolution information, record information obtained by the association as history information including the recorded position information and the recorded resolution information of each of the partial images, and associate the mark information with the history information, the partial images being output by the output unit according to information on a series of continuous or intermittent operations by the user that is acquired by the acquisition unit, and
the processing unit is configured to execute, when the output position information group constituting each of the partial images to be output by the output unit includes at least one piece of recorded position information included in the history information, processing for presenting the mark information associated with the history information.

(22) The mark information presenting apparatus according to any one of (11) to (18) and (21), further including:
an acquisition unit configured to acquire information on an operation by the user for causing the output unit to output the partial image, in which
the recording unit is configured to associate the mark information with the position information and the resolution information on the partial image output by the output unit according to the operation information acquired by the acquisition unit and record the position information and the resolution information that are associated with the mark information as the recorded position information and the recorded resolution information, respectively; and
the processing unit is configured to execute, when the output position information group of the partial image to be output by the output unit according to the operation information acquired by the acquisition unit includes the recorded position information and the resolution of the output resolution information of the partial image to be output by the output unit is equal to the resolution of the recorded resolution information corresponding to the recorded position information, processing for presenting the mark information associated with the recorded position information and the recorded resolution information.

(23) The mark information presenting apparatus according to any one of (11) to (18), (21), and (22), in which
the recording unit is configured to associate, with each of at least two or more resolution ranges including the resolution of the output resolution information of the partial image output by the output unit, the mark information and record information on the resolution range with which the mark information is associated, as information on recorded resolution range, and
the processing unit is configured to execute, when the resolution of the output resolution information falls within the recorded resolution range, processing for presenting the mark information corresponding to the output partial image.

(24) The mark information presenting apparatus according to (11), in which
the processing unit is configured to execute, when the output position information group includes a plurality of pieces of recorded position information, processing for presenting a plurality of pieces of mark information associated with the plurality of pieces of recorded position information.

(25) The mark information presenting apparatus according to (13), in which
the processing unit is configured to execute, according to information on an operation by a user using the mark image, processing for presenting the annotation information corresponding to the mark image.

(26) The mark information presenting apparatus according to any one of (11) to (18) and (21) to (23), in which
the recording unit is configured to set a threshold of the resolution according to an operation by the user and to associate the set threshold of the resolution with the position information and the mark information and record the set threshold, and
the processing unit is configured to execute, when the resolution of the partial image to be output by the output unit exceeds the set threshold, processing for presenting the mark information corresponding to the partial image to be output.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A mark information presenting apparatus, comprising:
an output unit configured to output a partial image, the partial image taken from within an entire image having an arbitrary resolution among entire images generated at a plurality of different resolutions with respect to a single target, the partial image;
a microphone configured to receive speech of a user;
a recording unit configured to record the speech of the user as audio information and associate the audio information with information on a position within the entire image and information on the resolution of the output partial image and record the position information and the resolution information that are associated with the audio information as recorded position information and recorded resolution information, respectively; and
a processing unit configured to execute, when an output position information group constituting the partial image to be output includes the recorded position information, processing for presenting the audio information associated with at least the recorded position information;
the processing unit is configured to execute, when the output position information group includes the recorded position information and a resolution of output resolution information of the partial image to be output by the output unit is equal to or larger than a resolution of the recorded resolution information corresponding to the recorded position information, processing for presenting the audio information associated with the recorded position information and the recorded resolution information;
the recording unit is further configured to record annotation information and a mark image to be combined in the partial image, and
the processing unit is configured to execute processing for presenting the annotation information;
the processing unit is configured to combine, when the output position information group constituting the partial image to be output includes a plurality of pieces of recorded position information, a plurality of mark images associated with the plurality of pieces of recorded position information, in the partial image to be output.

2. The mark information presenting apparatus according to claim 1, wherein
the processing unit is configured to combine, among a plurality of pieces of recorded resolution information associated with the plurality of pieces of recorded position information, one of an image having a resolution equal to the resolution of the output resolution information of the partial image to be output by the output unit and an image corresponding to resolution information including a resolution within a recorded resolution range, in the partial image to be output.

3. The mark information presenting apparatus according to claim 1, wherein
the recording unit is configured to associate priority information indicating a priority upon presentation of each of a plurality of pieces of annotation information corresponding to the plurality of images with a plurality of pieces of audio information and record the priority information, and
the processing unit is configured to set, according to the recorded priority information, one of whether or not to present the plurality of pieces of annotation information and a time order of presenting the plurality of pieces of annotation information.

4. The mark information presenting apparatus according to claim 1, wherein
the recording unit is configured to associate, with each of at least two or more resolution ranges including the resolution of the output resolution information on the partial image output by the output unit, the annotation information and set a different recorded resolution range for each of different pieces of priority information, and
the processing unit is configured to execute processing for presenting at least one piece of annotation information among a plurality of pieces of annotation information according to the set recorded resolution range, the plurality of pieces of annotation information being associated with the plurality of pieces of recorded position information included in the output position information group.

5. The mark information presenting apparatus according to claim 1, further comprising:
an acquisition unit configured to acquire information on an operation by a user for causing the output unit to output the partial image, wherein
the recording unit is configured to execute, when, out of the operation information acquired by the acquisition unit, predetermined operation information is acquired, the association processing of the audio information with respect to the partial image output according to the predetermined operation information, and
the processing unit is configured to execute, when an output position information group constituting the partial image output according to the predetermined operation information includes the recorded position information, processing for presenting the audio information associated with at least the recorded position information.

\* \* \* \* \*